(12) United States Patent
Oklejas, Jr. et al.

(10) Patent No.: US 10,156,857 B2
(45) Date of Patent: *Dec. 18, 2018

(54) METHOD AND SYSTEM FOR INJECTING SLURRY USING ONE SLURRY PRESSURIZING TANK

(71) Applicant: VECTOR TECHNOLOGIES, LLC, Monroe, MI (US)

(72) Inventors: Eli Oklejas, Jr., Newport, MI (US); Robert A. Oklejas, Monroe, MI (US); Ryan Kitzmiller, Toledo, OH (US)

(73) Assignee: Vector Technologies LLC, Monroe, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,140

(22) Filed: Feb. 5, 2018

(65) Prior Publication Data

US 2018/0231993 A1    Aug. 16, 2018

Related U.S. Application Data

(60) Provisional application No. 62/457,447, filed on Feb. 10, 2017.

(51) Int. Cl.
*G05D 7/06* (2006.01)
*F16K 11/048* (2006.01)
(Continued)

(52) U.S. Cl.
CPC .......... *G05D 7/0664* (2013.01); *E21B 43/267* (2013.01); *F16K 11/044* (2013.01); *F16K 11/048* (2013.01)

(58) Field of Classification Search
CPC .... G05D 7/0664; F16K 11/044; F16K 11/048
(Continued)

(56) References Cited

U.S. PATENT DOCUMENTS 3,326,135 A   6/1967  Smith
6,540,487 B2  4/2003  Polizos et al.
(Continued)

FOREIGN PATENT DOCUMENTS

CA    2712522 A1    2/2012
DE    4022379 A1    1/1991
(Continued)

OTHER PUBLICATIONS

International Search Report for PCT/US2017/060559 dated Feb. 14, 2018, 7 pages.
(Continued)

*Primary Examiner* — Taras P Bemko
(74) *Attorney, Agent, or Firm* — Harness, Dickey & Pierce, P.L.C.

(57) ABSTRACT

A system and method for injecting slurry includes a first elongated tank comprising a first end having a first volume and a second end having a second volume, said first volume separated from the second volume, a first pipe having a first end external to the first elongated tank receiving clear fluid and a second end coupled to the first volume and a plurality of slurry valves fluidically coupled to the first elongated tank. The plurality of slurry valves have a first state communicating high pressure slurry from the second volume to the slurry injection site and a second state communicating low pressure slurry into the second volume. A plurality of clear fluid valves are fluidically coupled to the first elongated tank and communicate high pressure clear fluid to the first volume in the first state and communicate low pressure clear fluid from the first volume in the second state.

31 Claims, 19 Drawing Sheets

(51) Int. Cl.
  *F16K 11/044*   (2006.01)
  *E21B 43/267*   (2006.01)

(58) Field of Classification Search
  USPC .......................................................... 166/90.1
  See application file for complete search history.

(56) References Cited

U.S. PATENT DOCUMENTS

| | | |
|---|---|---|
| 7,201,557 B2 | 4/2007 | Stover |
| 7,871,522 B2 | 1/2011 | Stover et al. |
| RE42,432 E | 6/2011 | Stover |
| 7,997,853 B2 | 8/2011 | Pique et al. |
| 8,075,281 B2 | 12/2011 | Martin et al. |
| 8,579,603 B2 | 11/2013 | Oklejas et al. |
| 8,742,604 B2 | 6/2014 | Dyer et al. |
| 8,834,028 B2 | 9/2014 | Winkler et al. |
| 9,440,895 B2 | 9/2016 | Arluck et al. |
| 9,604,889 B2 | 3/2017 | Arluck et al. |
| 9,683,574 B2 | 6/2017 | Winkler et al. |
| 9,695,795 B2 | 7/2017 | Martin et al. |
| 9,739,128 B2 | 8/2017 | Ghasripoor et al. |
| 9,759,054 B2 | 9/2017 | Gay et al. |
| 9,764,272 B2 | 9/2017 | Martin et al. |
| 9,835,018 B2 | 12/2017 | Krish et al. |
| 9,885,372 B2 | 2/2018 | Arluck et al. |
| 9,920,774 B2 | 3/2018 | Ghasripoor et al. |
| 9,945,210 B2 | 4/2018 | Theodossiou |
| 9,945,216 B2 | 4/2018 | Ghasripoor et al. |
| 9,970,281 B2 | 5/2018 | Ghasripoor et al. |
| 9,975,789 B2 | 5/2018 | Ghasripoor et al. |
| 9,976,573 B2 | 5/2018 | Martin et al. |
| 2014/0091573 A1 | 4/2014 | Berbari |
| 2014/0093407 A1 | 4/2014 | Calkins et al. |
| 2014/0128655 A1 | 5/2014 | Arluck et al. |
| 2014/0128656 A1 | 5/2014 | Arluck et al. |
| 2014/0260357 A1 | 9/2014 | Marte |
| 2014/0260379 A1 | 9/2014 | Marte |
| 2014/0260380 A1 | 9/2014 | Marte |
| 2014/0260381 A1 | 9/2014 | Marte et al. |
| 2014/0263682 A1 | 9/2014 | Marte |
| 2015/0043845 A1 | 2/2015 | Winkler et al. |
| 2015/0068975 A1 | 3/2015 | Krish |
| 2015/0096739 A1 | 4/2015 | Ghasripoor et al. |
| 2015/0118131 A1 | 4/2015 | Martin et al. |
| 2015/0184492 A1 | 7/2015 | Ghasripoor et al. |
| 2015/0184502 A1 | 7/2015 | Krish et al. |
| 2015/0184540 A1 | 7/2015 | Winkler et al. |
| 2015/0184678 A1 | 7/2015 | Arluck et al. |
| 2015/0198338 A1 | 7/2015 | Marte |
| 2015/0211384 A1 | 7/2015 | Krish et al. |
| 2015/0275844 A1 | 10/2015 | Winkler et al. |
| 2015/0292310 A1 | 10/2015 | Ghasripoor et al. |
| 2016/0023539 A1 | 1/2016 | Johnson, Sr. |
| 2016/0032691 A1 | 2/2016 | Richter et al. |
| 2016/0032702 A1 | 2/2016 | Gay et al. |
| 2016/0039054 A1 | 2/2016 | Ghasripoor et al. |
| 2016/0040510 A1 | 2/2016 | Martin et al. |
| 2016/0040511 A1 | 2/2016 | Theodossiou |
| 2016/0062370 A1 | 3/2016 | Gaines-Germain et al. |
| 2016/0138649 A1 | 5/2016 | Anderson et al. |
| 2016/0146229 A1 | 5/2016 | Martin et al. |
| 2016/0160849 A1 | 6/2016 | Gains-Germain et al. |
| 2016/0160881 A1 | 6/2016 | Anderson et al. |
| 2016/0160882 A1 | 6/2016 | Morphew |
| 2016/0160887 A1 | 6/2016 | Anderson |
| 2016/0160888 A1 | 6/2016 | Morphew |
| 2016/0160889 A1 | 6/2016 | Hoffman et al. |
| 2016/0160890 A1 | 6/2016 | Anderson |
| 2016/0160917 A1 | 6/2016 | Deshpande |
| 2016/0222985 A1 | 8/2016 | Oklejas, Jr. |
| 2016/0281487 A1 | 9/2016 | Ghasripoor et al. |
| 2016/0312140 A1 | 10/2016 | Krish et al. |
| 2017/0051762 A1 | 2/2017 | Ghasripoor et al. |
| 2017/0130743 A1 | 5/2017 | Anderson |
| 2017/0267549 A1 | 9/2017 | Ghasripoor et al. |
| 2017/0306986 A1 | 10/2017 | McLean, Jr. et al. |
| 2017/0306987 A1 | 10/2017 | Theodossiou |
| 2017/0335668 A1 | 11/2017 | Ghasripoor et al. |
| 2017/0350428 A1 | 12/2017 | Martin et al. |
| 2018/0087364 A1 | 3/2018 | Krish et al. |
| 2018/0094648 A1 | 4/2018 | Hoffman et al. |
| 2018/0149005 A1 | 5/2018 | Baird et al. |

FOREIGN PATENT DOCUMENTS

| | | |
|---|---|---|
| GB | 854565 A | 11/1960 |
| GB | 1420424 A | 1/1976 |
| JP | S6419185 A | 1/1989 |
| JP | 3395122 B2 | 4/2003 |

OTHER PUBLICATIONS

International Search Report dated Sep. 27, 2018 for PCT/US2018/017455.

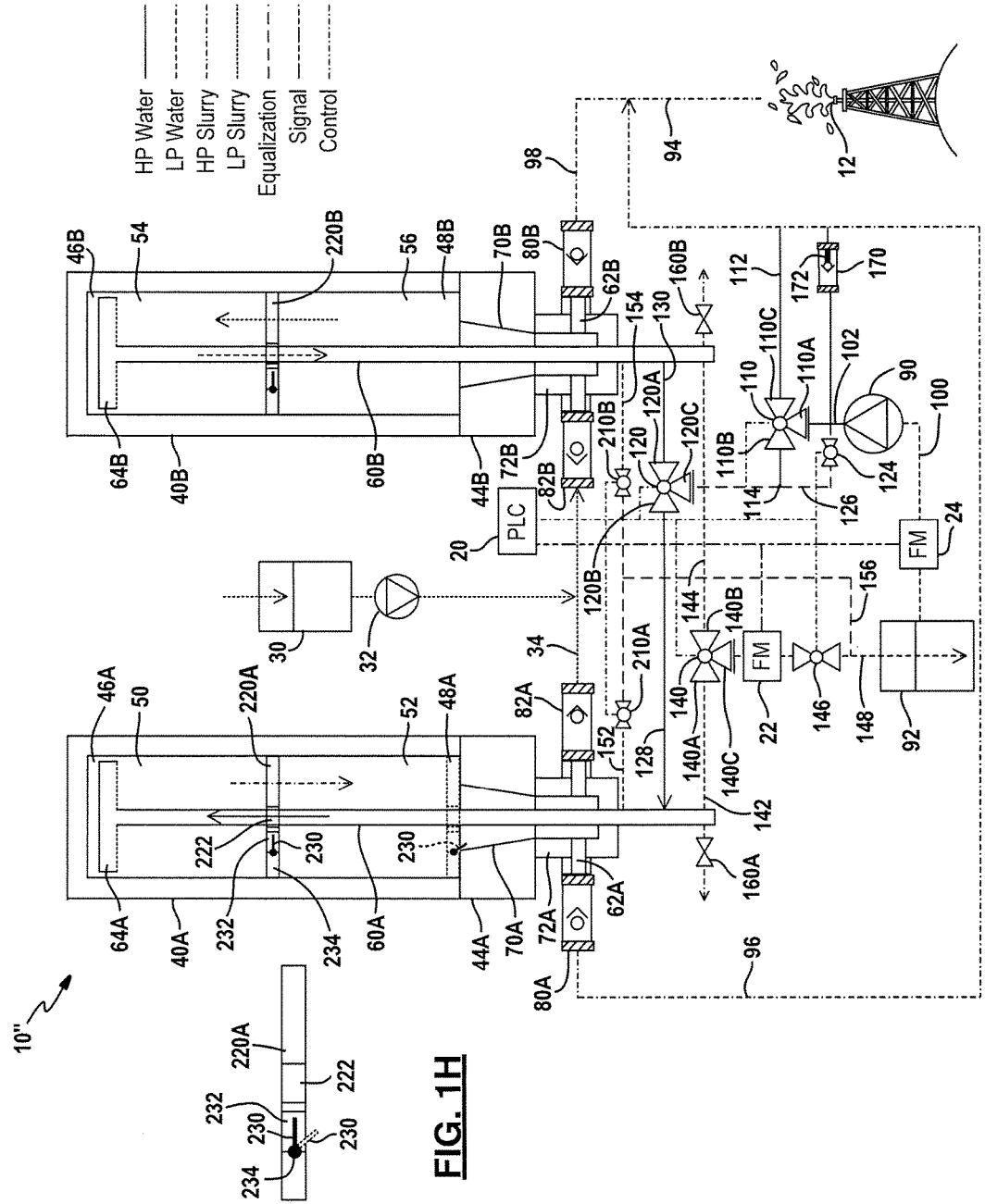

Valve states for changing cylinder operation

State A = Tank 40A pumping HP slurry, Tank 40B filling with LP slurry
State A' = Tank 40A filling with LP slurry, Tank 40B pumping HP slurry

| System State | Valves CV 80A | CV 82A | CV 82B | CV 80B | TWV 140 | TWV 120 | TWV 110 | EV 150 | EV 124 | FV 146 | ΔTime (sec) | Comments Figure number |
|---|---|---|---|---|---|---|---|---|---|---|---|---|
| A | O | C | O | C | 40B | 40A | OP | 40B | C | Partial | 0.00 | Steady state |
| A-1 | O | C | O | C | 40B | 40A | DIV | 40B | C | Partial | 0.20 | Divert HPP flow to slurry manifold 94 |
| A-2 | O | C | O | C | 40B | 40A | DIV | 40A | C | Partial | 0.30 | Depressurize Cylinder 1 |
| A-3 | C | O | C | C | 40A | 40B | DIV | 40A | C | Partial | 0.20 | Switch TWV140 and TWV120 valve states |
| A-4 | C | O | C | C | 40A | 40B | DIV | 40A | O | Partial | 0.25 | Pressurize HPP pipe 114 |
| A-5 | C | O | C | O | 40A | 40B | OP | 40A | C | Partial | 0.20 | Stop HPP diversion |
| A' (switched cylinders) | C | O | C | O | 40A | 40B | OP | 40A | C | Partial | | Steady state |

| | 1.15 Time to switch states |
|---|---|

Notation:
"C" = closed
"O" = open
"OP" = normal operation
"DIV" = Flow diverted to slurry manifold 94
"Partial" = Valve position is adjusted to various values by PLC Notes:
- Cells are bolded to indicate a change in valve state
- Valve switching times are approximate
- Several valve switching step can overlap to reduce overall state switch time
- Valve 170 (not shown in table) is open only during upset conditions or equipment failure that could result in an overpressure the HPP

FIG. 4A

Valve states for changing cylinder operation

State A = Tank 40A pumping HP slurry, Tank 40B filling with LP slurry
State A' = Tank 40A filling with LP slurry, Tank 40B pumping HP slurry

| System State | Valves CV 80A | CV 82A | CV 82B | CV 80B | TWV 140 | TWV 120 | TWV 110 | EV1A 210A | EV1B 210B | EV2 124 | FV1 146 | ΔTime (sec) | Comments (sec) Figure number |
|---|---|---|---|---|---|---|---|---|---|---|---|---|---|
| A | O | C | O | C | 40B | 40A | OP | C | O | C | Partial | 0.00 | Steady state |
| A-1 | O | C | O | C | 40B | 40A | DIV | C | O | C | Partial | 0.20 | Divert HPP flow to slurry manifold 94 |
| A-2 | O | C | O | C | 40B | 40A | DIV | O | C | C | Partial | 0.30 | Depressurize Cylinder 1 |
| A-3 | C | O | C | O | 40A | 40B | DIV | O | C | C | Partial | 0.20 | Switch TWV140 and TWV120 valve states |
| A-4 | C | O | C | O | 40A | 40B | DIV | O | C | O | Partial | 0.25 | Pressurize HPP pipe 114 |
| A-5 | C | O | C | O | 40A | 40B | OP | O | C | C | Partial | 0.20 | Stop HPP diversion |
| A' (switched cylinders) | C | O | C | O | 40A | 40B | OP | O | C | C | Partial | | Steady state |

1.15  Time to switch states

Notation:

"C" = closed
"O" = open
"OP" = normal operation
"DIV" = Flow diverted to slurry manifold 37
"Partial" = Valve position is adjusted to various values by PLC Notes:
- Cells are bolded to indicate a change in valve state
- Valve switching times are approximate
- Several valve switching step can overlap to reduce overall state switch time
- Valve 26 (not shown in table) is open only during upset conditions or equipment failure that could result in an overpressure the HPP

FIG. 4B

Valve states single cylinder slurry pressurizer with flow diversion for FIG. 1E

State A = Cylinder 1 pumping HP slurry
State A' = Cylinder 1 filling with LP slurry

| | Valves | | | | | | | | Δ Time | |
|---|---|---|---|---|---|---|---|---|---|---|
| System State | 80A | 82A | 120' | 140' | 110 | 124 | 210A | 146 | (sec) | Figure Number |
| A (slurry discharge) | O | C | O | C | OP | C | C | Partial | 0.00 | Steady state |
| A-1 (start slurry fill cycle) | O | C | O | C | DIV | C | C | Partial | 0.30 | Divert HPP flow to slurry manifold 94 |
| A-2 | C | O | O | C | DIV | C | O | Partial | 0.30 | Depressurize tank 40A |
| A-3 | C | O | C | O | DIV | C | C | Partial | 0.30 | Switch valve states |
| A' (slurry fill) | C | O | C | O | DIV | O | C | Partial | 0.30 | Steady state – slurry fill |
| A'-1 (start slurry discharge cycle) | C | O | O | C | DIV | C | C | Partial | 0.30 | Stop slurry fill |
| A'-2 | O | C | O | C | OP | C | C | Partial | 0.00 | Back to state A |
| A | | | | | | | | | | |
| | | | | | | | | | 1.50 | Time to switch states |

Notation:
"C" = closed
"O" = open
"OP" = normal operation
"DIV" = Flow diverted to slurry manifold 94
"Partial" = Valve position is adjusted to various values by PLC Notes:
- Cells are bolded to indicate a change in valve state
- Valve switching times are approximate
- Several valve switching step can overlap to reduce overall state switch time
- Note that flow diversion occurs during slurry fill cycle

FIG. 4C

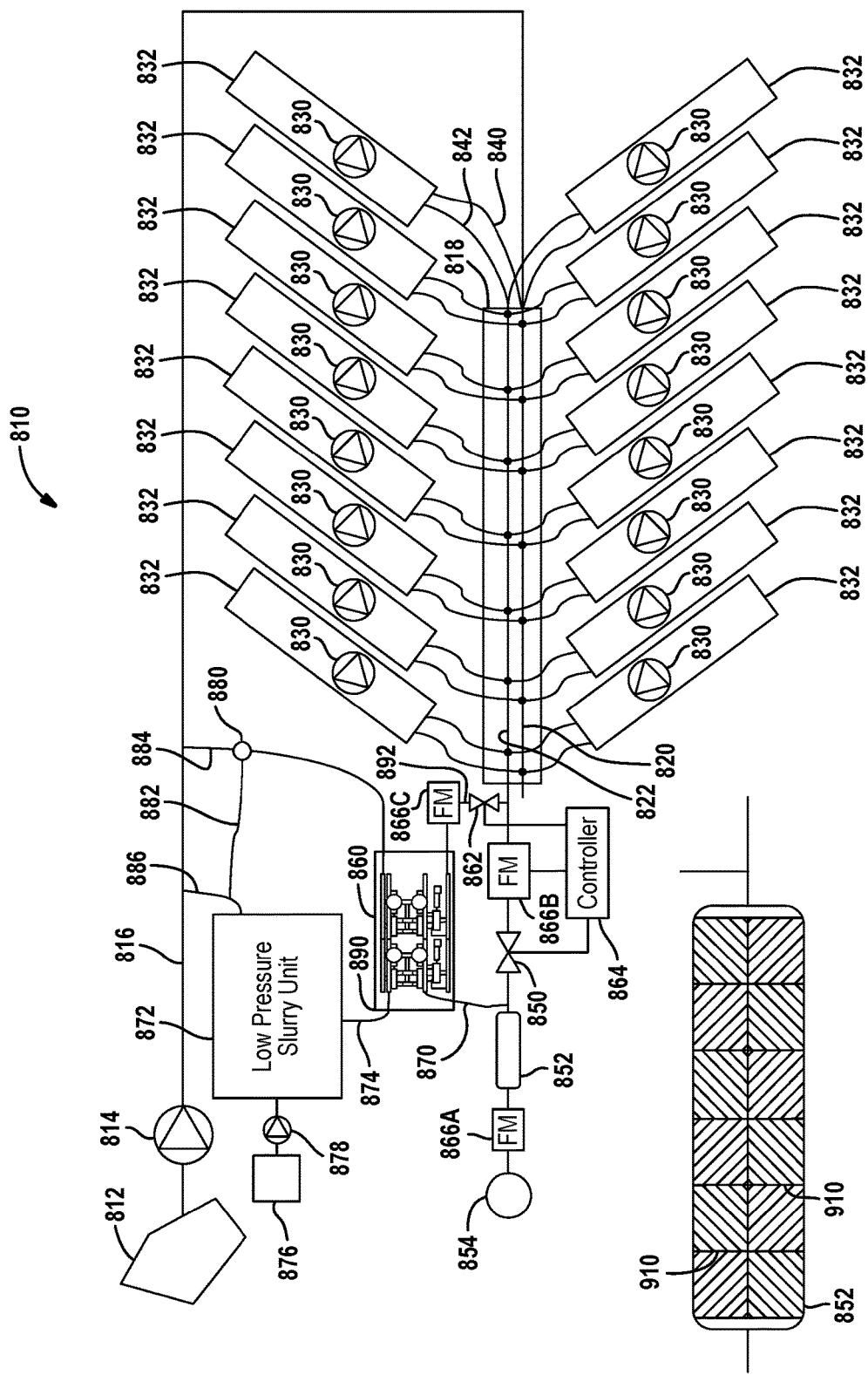

METHOD AND SYSTEM FOR INJECTING SLURRY USING ONE SLURRY PRESSURIZING TANK

CROSS-REFERENCE TO RELATED APPLICATIONS

This application is a non-provisional application of provisional application 62/457,447, filed Feb. 10, 2017, the disclosure of which is incorporated by reference herein. This application also relates to U.S. application Ser. No. 15/888,133 filed Feb. 5, 2018 and U.S. application Ser. No. 15/888,154 filed Feb. 5, 2018 filed concurrently herewith.

TECHNICAL FIELD

The present disclosure relates generally to a slurry injection system, and, more specifically, to a method and system for using at least a single tank or multiple stages of single tanks to enable a continuous injection process.

BACKGROUND

The statements in this section merely provide background information related to the present disclosure and may not constitute prior art.

Pumping of process fluids are used in many industries Process fluids may be pumped with various types of pumps such as centrifugal, positive displacement or use of a pressurized drive fluid acting upon the process fluid. A slurry is one type of process fluid used in a process. Slurries are typically abrasive in nature. Slurry pumps are used in many industries to provide the slurry into the process. Sand injection for hydraulic fracturing (fracking), high pressure coal slurry pipelines, mining, mineral processing, aggregate processing, and power generation all use slurry pumps. All of these industries are extremely cost competitive. A slurry pump must be reliable and durable to reduce the amount of down time for the various processes.

Hydraulic fracturing of gas and oil bearing formations requires high pressures typically up to 15,000 psi (103421 kPa) with flow rates up to 500 gallons per minute (1892 liters per minute). The total flow rate using multiple pumps may exceed 5,000 gallons per minute (18927 liters per minute).

Slurry pumps are subject to severe wear because of the abrasive nature of the slurry. Typically, slurry pumps display poor reliability, and therefore must be repaired or replaced often. This increases the overall process costs. It is desirable to reduce the overall process costs and increase the reliability of a slurry pump.

Other components of the slurry injection system also have weaknesses due to the abrasive slurries travelling therethrough. Check valves, rapid changes in pressure, erosion or "wire drawing" caused by high velocity fluid and pipe joints themselves all are subject to failure. Further, pressure vessels are used and if a large number of penetrations in the tanks are used, those places are also subject to cracking failure.

SUMMARY

The present disclosure is directed to a method and system that allows abrasive slurries to be injected into a very high-pressure process stream with minimal wear on the system components. The system provides high reliability due to the reduced amount of wear.

In one aspect of the disclosure, a slurry injection system comprises a low pressure clear fluid manifold, a high pressure clear fluid manifold and a plurality of clear fluid pumps receiving clear fluid from the low pressure manifold. The plurality of clear fluid pumps pressurize the clear fluid into high pressure clear fluid and communicates the high pressure clear fluid into the high pressure clear fluid manifold. The system further includes a blender unit having low pressure slurry therein and a mixer in fluid communication with the high pressure clear fluid manifold through a first valve. A slurry pressurizer is in fluid communication with the high pressure clear fluid manifold through a second valve, the mixer, the blender unit and the low pressure clear fluid manifold. The slurry pressurizer forms high pressure slurry by pressurizing the low pressure slurry from the blender unit using high pressure clear fluid from the high pressure clear fluid manifold. The slurry pressurizer communicates high pressure slurry to the mixer and communicating low pressure fluid to the low pressure clear fluid manifold. The mixer mixes the high pressure slurry and clear fluid from the first valve to form a mixture that is communicated to an injection site.

In another aspect of the disclosure, a method of operating a slurry injection system comprising a low pressure clear fluid manifold, a high pressure clear fluid manifold, a plurality of clear fluid pumps, a blender unit, a mixer, and a slurry pressurizer comprises receiving clear fluid from the low pressure clear fluid manifold at the plurality of clear fluid pumps, pressurizing the clear fluid into high pressure clear fluid at the plurality of clear fluid pumps, communicating the high pressure clear fluid into the high pressure clear fluid manifold from the plurality of clear fluid pumps, communicating high pressure clear fluid from the high pressure clear fluid manifold to the mixer through a first valve, communicating the high pressure clear fluid from the high pressure clear fluid manifold to the slurry pressurizer through a second valve, pressurizing, by the slurry pressurizer, low pressure slurry from the blender unit using high pressure clear fluid from the high pressure clear fluid manifold to form high pressure slurry, communicating low pressure fluid from the slurry pressurizer to the low pressure clear fluid manifold, blending, at a mixer, the high pressure slurry with high pressure clear fluid from the second valve to form a slurry mixture, and communicating the mixture to an injection site.

In another aspect of the disclosure, a system for injecting slurry from a slurry source into a slurry injection site comprises a first elongated tank comprising a first end having a first volume and a second end having a second volume, said first volume separated from the second volume, a first pipe having a first end external to the first elongated tank receiving clear fluid and a second end coupled to the first volume and a plurality of slurry valves fluidically coupled to the first elongated tank. The plurality of slurry valves have a first state communicating high pressure slurry from the second volume to the slurry injection site and a second state communicating low pressure slurry into the second volume. A plurality of clear fluid valves are fluidically coupled to the first elongated tank and communicate high pressure clear fluid to the first volume in the first state and communicate low pressure clear fluid from the first volume in the second state.

In yet another aspect of the disclosure, a method of injecting slurry at a slurry injection site using a slurry injection system having a first elongated tank having a first volume and a second volume comprises using a plurality of slurry valves fluidically coupled to the first elongated tank.

The method further comprises in a first state, communicating high pressure slurry from the second volume to the slurry injection site and in a second state, communicating low pressure slurry to the second volume. The method further comprises using a plurality of clear fluid valves fluidically coupled to the first elongated tank, in a first state, communicating high pressure clear fluid to the first volume, and, in a second state, communicating low pressure clear fluid from the first volume.

In yet another aspect of the disclosure, a system for injecting slurry from a slurry source into a slurry injection site includes a first elongated tank comprising a first end having a first volume and a second end having a second volume, said first volume separated from the second volume. The system further includes a first pipe having a first end external to the first elongated tank receiving clear fluid and a second end coupled to the first volume. The system further includes a second elongated tank comprising a first end having a third volume and a second end having a fourth volume, said third volume separated from the fourth volume. The second elongated tank has a second pipe having a first end external to the second elongated tank that receives clear fluid and a second end within the third volume. A plurality of slurry valves fluidically are coupled the first elongated tank and the second elongated tank. The plurality of slurry valves have a first state communicating high pressure slurry from the second volume to the slurry injection site and communicating low pressure slurry to the fourth volume and a second state communicating low pressure slurry to the second volume and high pressure slurry from the fourth volume to the slurry injection site. A plurality of clear fluid valves are fluidically coupled to the first elongated tank and the second elongated tank and communicate high pressure clear fluid to the first volume and communicate low pressure clear fluid from the third volume in a first state and communicating low pressure clear fluid to the first volume and high pressure clear fluid to the third volume in a second state.

In a further aspect of the disclosure, a method of injecting slurry at a slurry injection site using a slurry injection system having a first elongated tank having a first volume and a second volume and a second elongated tank having a third volume and a fourth volume comprising using a plurality of slurry valves fluidically coupled to the first elongated tank and the second elongated tank. In a first state, communicating high pressure slurry from the second volume to the slurry injection site, and communicating low pressure slurry to the fourth volume. In a second state, communicating low pressure slurry to the second volume, and communicating high pressure slurry from the fourth volume to the slurry injection site. Using a plurality of clear fluid valves fluidically coupled to the first elongated tank and the second elongated tank, in a first state, communicating high pressure clear fluid to the first volume, and communicating low pressure clear fluid from the third volume in a first state and, in a second state, communicating low pressure clear fluid to the first volume, and communicating high pressure clear fluid to the third volume.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1G is a schematic view of a slurry injection system according to a third example of the present disclosure.

FIG. 1H is a cross-sectional view of a piston formed according to the example of FIG. 1G.

FIG. 4A is a first example of a table for the various valve settings used during operation of the example of FIG. 1A.

FIG. 4B is a second example of a table for the various valve settings used during the operation of the example illustrated in FIG. 1B.

FIG. 4C is a third example of a table for the various valve settings corresponding to FIG. 1E.

FIG. 8A is a schematic of a slurry injection system disposed on trailers.

FIG. 8B is an enlarged cross-sectional view of the static mixer of FIG. 8A.

DETAILED DESCRIPTION

Figure 1A:
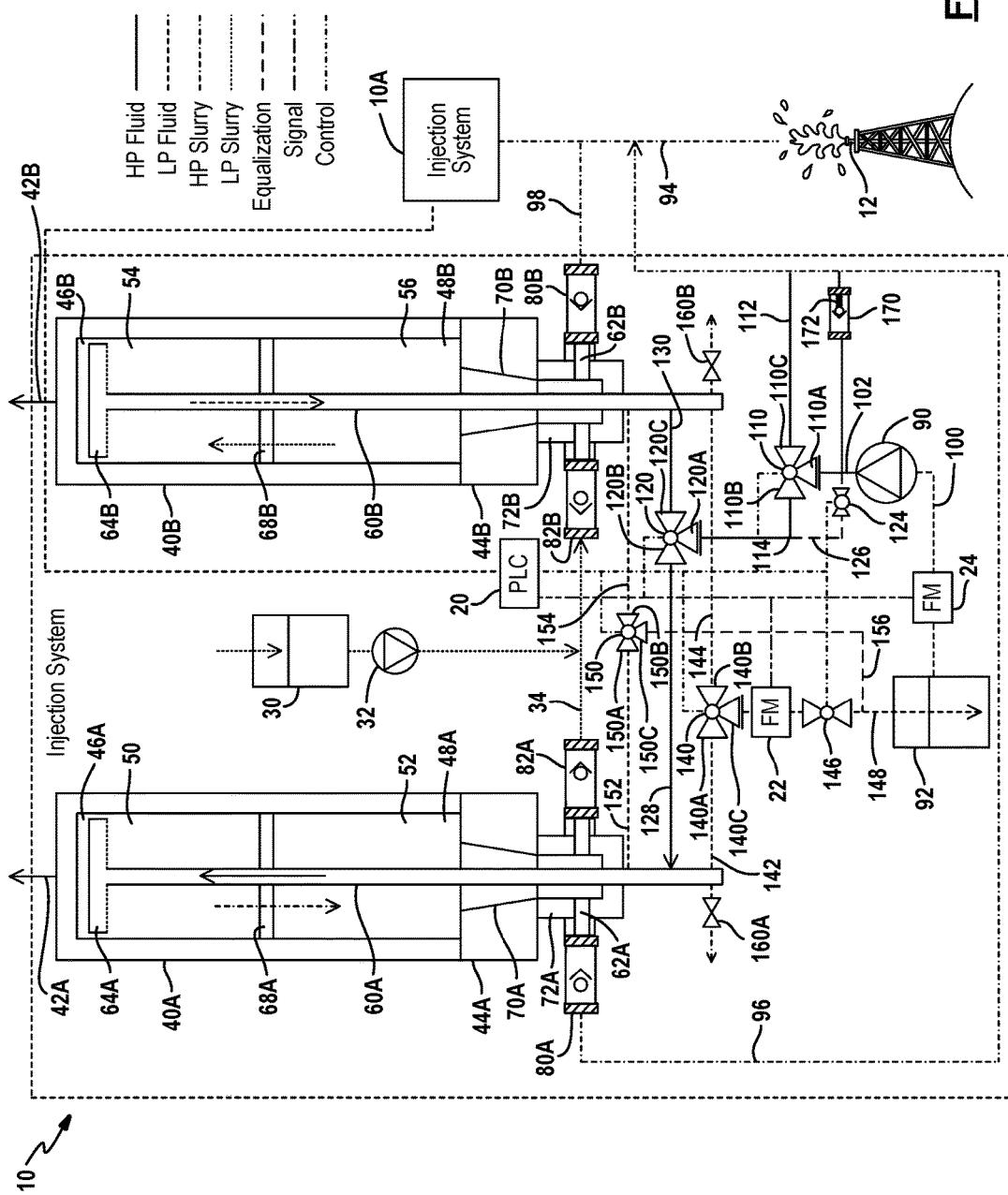
FIG. 1A is a schematic view of a slurry injection system according to a first example of the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure. The use of the words "low" and "high" are used relative to the pressures suitable for use in fracking. "Low" pressure is suitable for movement of fluids into or out of pipes. "High" pressure is on the order suitable for fracking which is typically thousands of pounds per square inch.

A slurry injection system 10 is illustrated for injecting slurry into a high pressure injection site 12. The injection system 10 may be used alone or in a multi-unit injection system such as the injection system unit 10A illustrated in fluid communication with the injection site 12. The injection systems 10, 10A may be operated using a common controller 20 such as a programmable logic controller (PLC). The controller 20 may be used to control the plurality of valves within the injection system 10 and the injection system 10A based on feedback from sensors such as flow rate sensors 22, 24. The flow rate sensors 22, 24 generate a first flow rate signal and a second flow rate signal.

The injection system 10 is used for injecting slurry from a slurry source such as a slurry tank 30 using a slurry circulation pump 32. The slurry, under low pressure from the circulation pump 32, is communicated to a first tank 40A and a second tank 40B through a low pressure slurry inlet pipe 34. As set forth below, the low pressure slurry is communicated to one tank at a time.

The first tank 40A and the second tank 40B may be cylindrical or elongated in shape and disposed in a vertical or any angle above horizontal manner as is illustrated. As will also be described below, it may be possible that the tanks may be positioned in a horizontal position. The tanks 40A, 40B have respective vertical longitudinal axes 42A, 42B, respectively. The tanks 40A, 40B each have a respective end cap 44A, 44B. The tanks 40A, 40B have respective first ends 46A, 46B and second ends 48A, 48B. The first end 46A of the first tank 40A has a first volume 50 of clear fluid and the second end 48A of the first tank 40A has a second volume 52 of slurry. The second tank 40B has a third volume 54 of clear fluid at the second end 46B and a fourth volume 56 of slurry at the second end 48B. The volumes 50, 52, 54 and 56 vary during the process.

The tanks 40A, 40B each include a longitudinally extending pipe 60A, 60B. The pipes 60A, 60B may be coaxial with the longitudinal axes at 42A, 42B. Each pipe 60A, 60B may extend from outside of the respective end caps 44A, 44B through an opening 62A, 62B. The pipes 60A, 60B extend to the first ends 46A, 46B through the second ends 48A, 46B of the tanks 40A, 40B.

A flow distribution plate 64A, 64B may be disposed at the ends of the pipes 60A, 60B toward the first ends 46A, 46B of the tanks 40A, 40B. The flow distribution plates 64A, 64B distribute incoming clear fluid across the diameter of the tanks to minimize the mixing of clear fluid with the slurry.

Each tank 40A, 40B is separated by a separation region 68A, 68B. While the region may be a defined area, in a hydraulic fracturing configuration, clear fluid may be separated from slurry naturally due to the less dense nature of the clear fluid. Should some mixing occur, the concentration of the slurry may be compensated for this. In this example, the clear fluid is disposed at the first ends 46A, 46B of the tanks 40A, 40B. The slurry is disposed at the second ends 48A, 48B. The clear fluid may be water, water mixed with chemicals or slurry additives such as ethylene glycol or other types of hydraulic fluid. "Clear", in this manner, refers to fluid that does not contain the particles of the slurry.

The slurry may contain various types or sizes of sand particles such as small quartz particles. The slurry may also include other types of chemicals to improve the lubrication and movement of the hydraulic fracturing particles therein.

The end caps 44A, 44B are affixed to the tanks 40A, 40B and may include conical portions 70A, 70B, respectively. The conical portions 70A, 70B may have a larger diameter toward the second volumes 52, 56 and taper to a smaller diameter at the bottom or outer end of the end caps 44A, 44B (longitudinally away from the second volumes 52, 56). The end caps 44A, 44B may also include cylindrical portions 72A, 72B that are coupled to a plurality of slurry valves. The plurality of slurry valves may include outlet valves 80A, 80B and inlet valves 82A, 82B. Valves 80A, 80B are used for communicating slurry under high pressure from the tanks 40A, 40B, respectively. In operation, the valves 80A, 80B may alternately communicate slurry from the second ends 48A, 48B of the respective tanks 40A, 40B.

Inlet valves 82A, 82B communicate fluid from the slurry inlet pipe 34 into the respective tanks 40A, 40B. The inlet valves 82A, 82B may operate alternately so that each of the valves 82A, 82B does not operate at the same time.

The valves 80A through 82B may be check valves that operate in the manner described below. That is, in general, one tank is receiving high pressure clear fluid to force high pressure slurry from the tank while the other tank is receiving low pressure slurry and removing low pressure clear fluid therefrom.

The injection site 12 has an injection manifold 94 that is in communication with a pipe 96 that extends from the check valve 80A and a pipe 98 that extends from the check valve 80B.

A plurality of clear fluid valves are used for communicating clear fluid to and from each of the tanks 40A, 40B and are in fluid communication with a high-pressure clear fluid pump 90 and a clear fluid tank 92.

The clear fluid tank 92 supplies clear fluid to the high-pressure pump 90 through pipe 100 and the flow rate sensor 24. A pipe 102 supplies pressurized clear fluid to a three-way valve 110. The three-way valve 110 has an inlet port 110A, a first outlet port 110B and an outlet port 110C. A pipe 112 fluidically communicates fluid from the outlet port 110C to the injection manifold 94 (or pipe 96 which leads to the injection manifold 94). A pipe 114 communicates high pressure clear fluid from the outlet port 110B to a second three-way valve 120. The valves 110 and 120 may be referred to as high pressure valves. A bypass valve 124 may also communicate fluid from the high pressure pump 90 to the pipe 114 through pipe 126. The valve 124 may be a two-way valve used to controllably pressurize port 110B and pipe 114 during changing states. The operation of valve 124 will be described in further detail below. The three-way valve 110 communicates fluid from the inlet port 110A to either the outlet port 110B or the outlet port 110C under control of the controller 20.

The three-way valve 120 selectively communicates high pressure clear fluid from the inlet port 120A to either the first outlet port 120B or the second outlet port 120C. Outlet port 120B is in fluid communication with the pipe 60A through pipe 128. Outlet port 120C is in fluid communication with the pipe 60B through pipe 130. Valve 120 is under control of the controller 20.

A three-way valve 140 is used for selectively communicating low pressure clear fluid from the tanks 40A and 40B under control of the controller 20. In particular, valve 140 has an inlet port 140A in fluid communication with pipe 60A through pipe 142. The valve 140 also has an inlet port 140B in fluid communication with pipe 60B through pipe 144. An outlet port 140C of valve 140 is in fluid communication with the clear fluid tank 92. The fluid from the outlet port 140C is in fluid communication with the flow rate sensor 22 and a two-way flow control valve 146. Both the valves 140 and 146 are controlled by the controller 20. The amount of fluid communicated to the tank 92 may be controlled by selectively controlling the amount of fluid flowing through the valve 146. The fluid communicated through the valves 140 and 146 is under low pressure as will be described in further detail below. The closed inlet port 140A or 140B of valve 140 is under high pressure due to the high pressure slurry operation. A pipe 148 communicates fluid from the valve 146 to the tank 92.

A three-way valve 150 is also in communication with the tanks 40A and 40B. In particular, the valve 150 includes an inlet port 150A in fluid communication with the pipe 60A through pipe 152. Inlet port 150B is in fluid communication with the pipe 60B through pipe 154. Outlet port 150C of valve 150 is in fluid communication with the pipe 148 through pipe 156. The valve 150, as will be described in more detail below, is used for equalization or reduction of the pressure within the tanks 40A, 40B. The valve 150 is used for communicating clear fluid from the first volume 50 and the third volume 54. The valve 150 selectively communicates high pressure clear fluid from either the inlet port 150A or port 150B to the outlet port 150C which ultimately communicates clear fluid through the pipe 156 to the tank 92. The pipe 156 may be directly input into the tank 92 or fluidically coupled to pipe 14B. The valve 150 is used to lower the pressure within the highly pressurized tanks prior to when the state of the valves 110, 120 is changed. Ultimately, the use of the valve 150 helps reduce the overall pressure and thus the effort to switch valves 110 and 120 is lower and potential for valve wear and erosion is reduced.

Pipes 60A and 60B may also be in fluid communication with a respective valve 160A, 160B. The valves 160A and 160B are at the lowest point of the respective pipes 60A, 60B and are used to purge air from the volume within the respective 40A, 40B.

A check valve 170 may also be in communication between the injection manifold 94 and the pump 90. In the illustration, check valve 170 is fluidly coupled between the pipe 102 and the injection manifold 94. The check valve 170 is used for directing the flow from the high pressure pump 90 to the injection manifold during upset conditions such as when the fluid paths, the high pressure valves or pipes associated therewith become blocked or equipment, such as the valves, fail. The check valve 170 may also include a spring 172. The spring 172 keeps check valve 170 closed until the upstream pressure (at the pipe 102) exceeds the downstream pressure (in the pipe 96) by a certain amount.

The valves 110 and 120 may be referred to as high pressure clear fluid valves. Valve 124 may also be included as a high pressure clear fluid valve. Valves 140 and 146 may be referred to as low pressure clear fluid valves. The valve 150 sees a combination of high pressure at the inlet ports 150A, 150B and low pressure at the outlet port 150C. The valve 124 is used for pressurizing the pipe 114 at a certain rate with high pressure clear fluid as will be described in more detail below. Collectively, the valves 110, 120, 124, 140 and 146 may be referred to as clear fluid valves. The plurality of clear fluid valves communicates both high pressure and low pressure fluid to and from the tanks 40A and 40B.

The valves 110, 120 and 140 are capable of handling extreme high pressures such as 15,000 psi (103421 kPa) at flow rates at hundreds of gallons per minute to provide such sealing force over 50,000 pounds (344737 kPa) may be provided against the valve seat. An extremely high differential is present. However, the valve 150 may be used to lower the overall pressure during switching. The purpose of valve 110 is to isolate the system by diverting the high-pressure clear fluid flow to the slurry line 96 through pipe 112. After system isolation, valve 150 can bleed of residual high pressure thereby placing components of the system at relatively low pressure. The operation of the valves will be described in more detail below. Although the valves are described as "three-way valves" and "two-way valves" and "check valves", other types of valves may be substituted therein. The three-way valves may be implemented in a plurality of two-way valves. Of course, other types of valves may be substituted from the valves. Check valves may, for example, be two-way valves controlled by the controller 20.

The valves 110, 120, 124, 140, 146 and 150 may be controlled by the controller 20 through the use of electrical signals therefrom. Other valves such as 160A and 160B, although not illustrated in communication with the controller 20, may also be electrically controlled thereby. In addition to electrically, valves 110, 120, 124, 140, 146, 150, 160A and 160B may also operate hydraulically or pneumatically Referring now to FIG. 1B, an injection system 10' is illustrated and labeled identically to that of FIG. 1A. The system 10' illustrated in FIG. 1B operates identically to that set forth in FIG. 1A and may also be part of a multi-unit system. The difference between the systems 10 and 10' is the three-way valve 150 has been replaced by a pair of two-way valves 210A and 210B for pressure reduction. The two-way valves 210A, 210B are used for communicating high pressure clear fluid to the clear fluid tank 92. The pipe 152 receives clear fluid from the pipe 60A which in turn is communicated through pipe 156 to the clear fluid tank 92. The valve 210B receives clear fluid from the pipe 60B through pipe 154. The valve 210B communicates clear fluid through the pipe 156 to the clear tank. For simplicity in overall maintenance and the like, the two-way valves 210A and 210B may be identical to that of valve 124. That way, maintenance is made easier due to the commonality of parts. The valves 210A and 210B all operate at a high differential and thus may need to be serviced more than the other valves in the system which operate with low pressure differentials between the inputs and the outputs.

The valves 210A and 210B are in electrical communication with the controller 20. That is, the controller 20 may control the opening and closing of the valves 210A, 210B. As will be described in more detail below, the valves may be operated so that either 210A or 210B are open but not both.

Figure 1B:
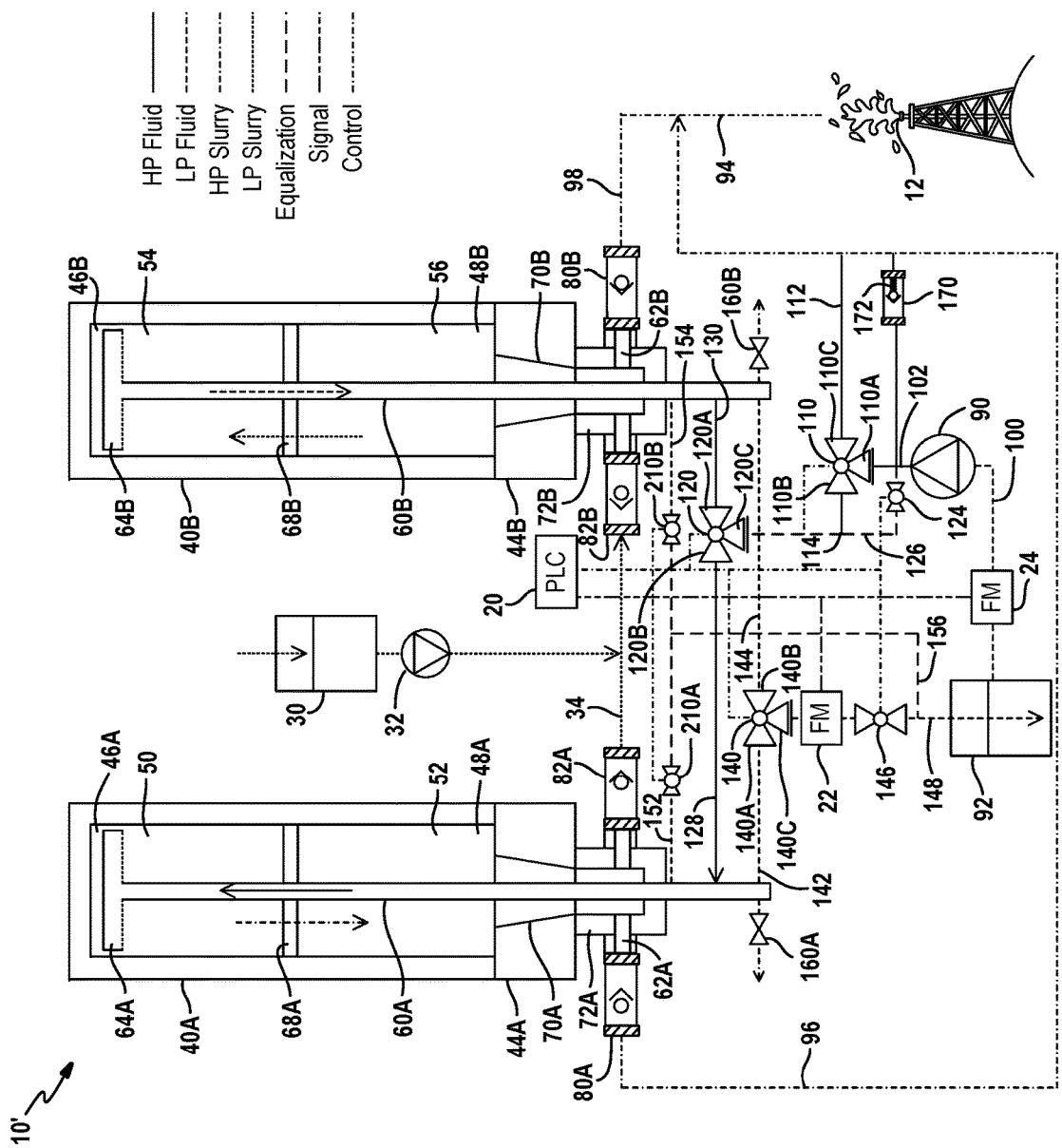
FIG. 1B is a schematic view of a slurry injection system according to a second example of the present disclosure.
Figure 1C:
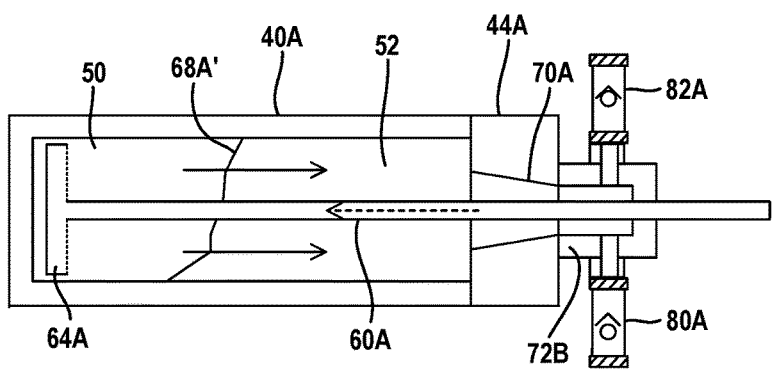
FIG. 1C is a side view of a horizontally disposed tank for use in the slurry injection system.

Referring now to FIG. 1C, the tank 40A is disposed vertically. The same reference numerals set forth in FIGS. 1A and 1B are used in FIG. 1C. Because of the higher density of slurry within the tank 40A, the denser slurry will settle toward the bottom of the tank 40A. This results in the clear fluid therein pushing a greater amount of fluid near the top relative to the bottom of the tank in the horizontal direction. As is illustrated, the interface 68A' is generally at an angle where the top portion is closer to the endcap 44A.

Figure 1D:
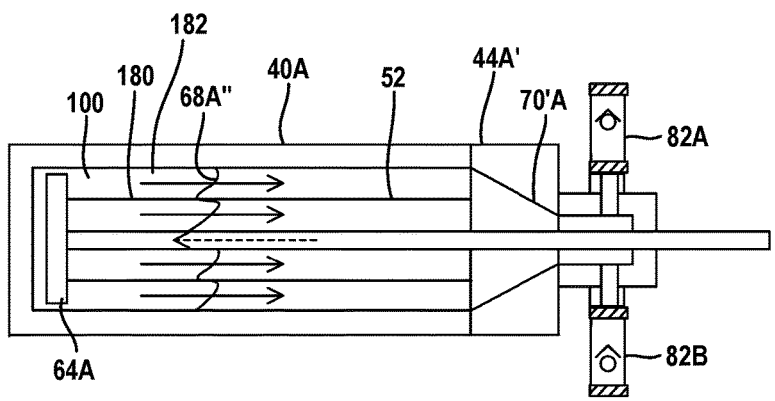
FIG. 1D is a side view of an alternative configuration of a tank disposed horizontally.

Referring now to FIG. 1D, an alternative embodiment of the horizontal tank 40A is set forth. In this example, a plurality of partitions 180 are used to define a plurality of horizontal channels 182. The partitions 180 help reduce the amount of departure of the interface 68A'' from vertical. In this example, the partitions 180 are formed with a plurality of types that extend in the longitudinal direction. The pipes in this example are cylindrical in shape and have gaps 184 therebetween. The gaps 184 also define horizontal channels within the tank 40A.

In FIG. 1D, the endcap 44A' is modified to have an enlarged conical portion 70A'. The conical portion 70A' extends in a vertical direction so as to be in fluid communication with the horizontal channels 182. That is, the diameter of the conical portion 70A' adjacent to the channels 182 has been increased. Thus, the conical portion 70A' redirects slurry both to and from the check valves 82A and 82B.

Figure 1E:
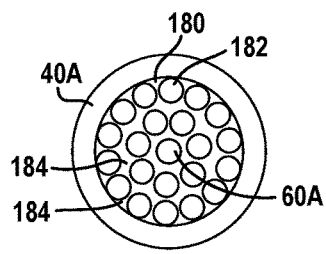
FIG. 1E is a cross-sectional view of the tank of FIG. 1D.

Referring now to FIG. 1E, a cross-sectional view of one example of the tank 40A is set forth. As can be seen, gaps 184 are disposed between the partitions 180 so that horizontal channels 182 are formed. The partitions are cylindrical in shape and may be formed by pipes. The pipe 60A provides clear fluid to the distributor plate 64A and distributes the clear fluid through the channels 182 and gaps 184 formed by the partitions 180.

Figure 1F:
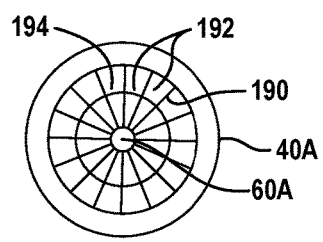
FIG. 1F is an alternative cross-sectional view of the tank of FIG. 1D.

Referring now to FIG. 1F, a plurality of partitions are illustrated having radially extending walls 190 that extend from the pipe 60A to the inner wall of the tank 40A. The walls 190 divide the tank into pie-shaped sectors 192. The pie-shaped sectors 192 may be further divided by a concentric wall 194. The concentric wall 194 shares a center point with the tank 40A and the pipe 60A. The walls 190, 194 act as a partition to reduce the amount of displacement of the slurry in an angular manner as illustrated in FIG. 1D.

Referring now to FIGS. 1G and 1H, a slurry injection system 10'' has each of the tanks 40A and 40B with a physical divider between the clear fluid between the first volume 50 and the second volume 52 and between the third volume 54 and the fourth volume 56 rather than the regions 68A, 68B described above. The tank 40A may be disposed horizontally (FIGS. 1A and B), vertically (FIGS. 1C-F) or at angles therebetween. The physical divider may be a piston 220A that has a first opening 222 for receiving the pipe 60A. A piston 220B configured in the same manner may be used in tank 40B around pipe 60B. The piston 220A is loosely fit around the pipe so that the piston 220A can freely travel along the pipe 60A as the pressure of the clear fluid changes. By providing the piston 220A, a more complete separation of the clear fluid and the slurry is provided with less chance of mixing with the slurry. With very high fill and discharge rates, some turbulence may occur and the slurry may mix with the fluid in the configuration of FIGS. 1A and 1B. Further, the tanks 40A, 40B may be oriented in a horizontal position. Providing pistons 220A, 220B also enables the use of the tanks in a horizontal to prevent the mixing of the different fluids within the tank. In tank 40A, the piston 220A is shown in a first position and dotted in a second position. Thus, the piston 220A may move in a longitudinal direction parallel to the longitudinal axis of the tank.

When the piston 220A reaches the end cap 44A, a flap 230 disposed within an opening 232 may open by rotating at the hinge 234. The flap 230 may be a spring-loaded flap and when a sufficient amount of pressure differential is formed between the two sides of the piston 220A, the flap 230 may provide some clear fluid through the opening 232. The hinge 234 may instead be spring-loaded to provide a resistance from the flap 230 opening until the piston 220 reaches the end cap 44A of the tank 40A. The dotted flap illustrates the open position of the flap 230. It may be desirable to allow a small amount of clear fluid from volume 50 to travel through the conical portion 70A into the cylindrical portion 72A and into opening 62A of the end cap 44A so that the clear fluid flows just past check valve 80A and into the pipe 96. The conical shape minimizes flow turbulence of the slurry out of the tanks 40A, 40B. This allows the check valve 80A to close within clear fluid and thus in a cleaner environment. Tank 40B may also be operated in a similar manner in that the clear fluid may transmit through the piston 220B so that the check valve 80B closes in a cleaner environment. The force needed to open the flap 230 by overcoming the spring force may be relatively small. That is, only a few pounds per square inch may be sufficient to open the flap to allow the fluid to flush the check valves 80A or 80B.

Figure 1I:
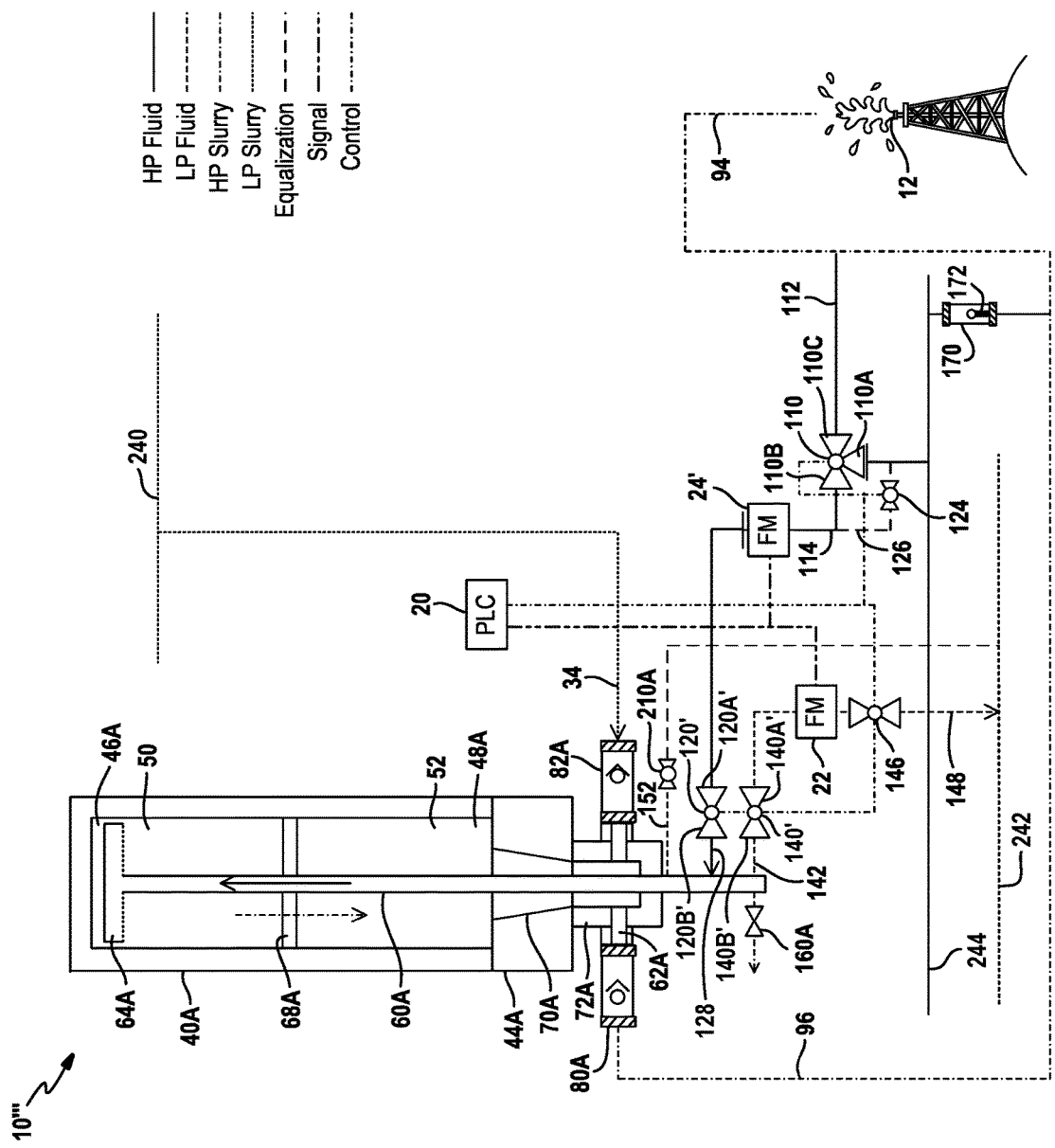
FIG. 1I is a schematic of a first example of a one tank system with high pressure clear fluid depressurization.

Referring now to FIG. 1I, the same reference numerals are used to indicate the same components as FIGS. 1A-1D. In this example, only a single tank 40A is provided with the attached components in the slurry injection 10'''. In this example, the tank 40A may be configured in the same manner as set forth in FIG. 1A or 1G in that the separation region 68A or the piston 220A (of FIGS. 1G and 1H) may be set forth between the first volume 50 and the second volume 52.

One difference between FIGS. 1A-1H and FIG. 1I is the lack of a slurry tank 30 and pump 32. In this example, the check valve 82A is in fluid communication with a low pressure slurry manifold 240. The low pressure slurry manifold 240 may be a common source shared between multiple tanks in a multiple tank type system. Of course, a slurry tank 30 and pump 32 may be in communication with the low pressure slurry manifold 240. Another difference between FIG. 1I and FIGS. 1A-1H is the lack of a high pressure pump 90 and a low pressure fluid tank 92. A low pressure clear fluid manifold 242 is used to receive the low pressure fluid from the port 140A'. A high pressure clear fluid manifold 244 is in communication with the valve 110. Although the pump 90 is not illustrated in this example, a high pressure clear fluid pump may be used somewhere in the system for generating the high pressure within the high pressure clear fluid manifold 244.

In this example, the flow rate sensor 24' has been modified to be positioned downstream of the valve 110 rather than between the clear fluid tank and the pump as illustrated above. The flow rate sensor has been labeled 24' to indicate its change of position. However, the flow rate sensor 24' generates a flow signal corresponding to the amount of flow into the pipe 60A and thus into the tank 40A.

The valves 120 and 140 illustrated above have been changed from three-way valves to two-way valves and are indicated as valve 120' and 140'. Port 120B' is in fluid communication with the pipe 60A. Likewise, port 140B' is also in fluid communication with the pipe 60A. Port 120A' is in fluid communication with the flow rate sensor 24', pipe 114 and valve 124 and port 110G of valve 110.

The slurry injection system 10''' may be referred to as an asynchronous system. In the previous figures, the fill rate of given tank is no faster than the discharge rate of the second tank. However, by increasing the fill rate of the slurry, the slurry fill duration can be substantially reduced and the higher capacity high pressure slurry for each tank is increased.

In operation, the three-way valve 110 communicated fluid from port 110A through 110G. The high pressure fluid enters pipe 114 and flow rate sensor 24'. The valve 120' communicates fluid from port 120A' to 120B' and into the pipe 60A.

It is presumed that the tank 40A was previously filled with low pressure slurry. The high pressure clear fluid forces high pressure slurry through check valve 80A and to the injection site 12 through the injection manifold 94. As in a similar manner to that set forth above, when the flow rate sensor 24' indicates the volume of clear fluid has flushed the slurry from the tank 40A and, if desired, passed check valve 80A, the three-way valve 110 is commanded to divert fluid from port 110A to outlet port 110C. Valve 210A is open which depressurizes the pipe 60A and the tank 40A by communicating fluid to the low pressure clear fluid manifold 242. Valve 120' is closed and valve 140' is open under low pressure. Thereafter the valve 210 is closed. Low pressure slurry from the low pressure slurry manifold 240 opens the check valve 82A to allow low pressure slurry to enter the tank 40A and expel clear fluid through the pipe 60A. The clear fluid leaves the tank 40A and pipe 60A through the open valve 140'. The opening and closing of the valves is under the control of the controller 20. The flow rate sensor 22 is used to indirectly determine the amount of slurry that has entered the tank 40A. When the amount of slurry as determined by monitoring the flow of clear fluid out of the tank, valve 140' is closed and valve 120' is open. The valve 124 is open which directs high pressure clear fluid from the high pressure clear fluid manifold 244 to be communicated to the pipe 114 through the pipe 126. After some pressure is built up in pipe 114, valve 110 communicates high pressure clear fluid from port 110A to port 1106 and valve 124 is closed. High pressure clear fluid then enters the pipe 60A through valve 120' and check valve 82A is closed and check valve 80A is open.

The valve 170 is configured in a similar manner to that described above relative to the spring 172. That is, the valve 170 may also include a spring 172 in a similar manner to that set forth above. Valve 170 opens when a sufficient force is between the high pressure clear fluid manifold 244 and the pipe 96 or the injection site 12. Again, the valve 170 is open when damage to the valve or other components of the system is present or flow conditions have been upset. The valve 170 should be open when the upstream pressure is about 100 pounds per square inch higher than the downstream pressure. This ensures that the valve will not open during normal operation.

Figure 1J:
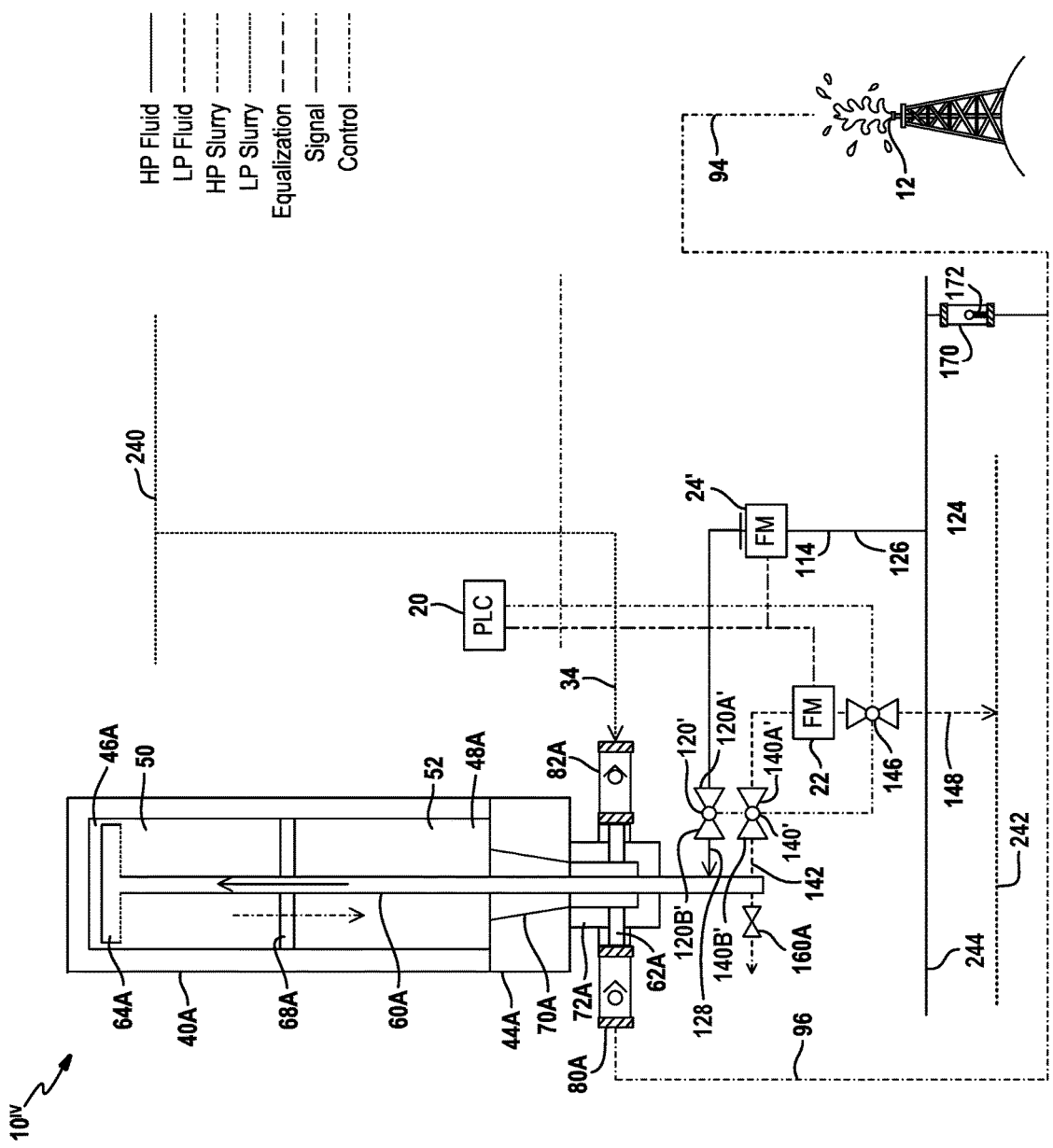
FIG. 1J is a schematic of a second example of a one tank system without high pressure clear fluid depressurization.

Referring now to FIG. 1J, the same components set forth in FIG. 1I are labeled in the same manner. In this example, the slurry injection system 10$^{IV}$ has valves 120' and 140' that are presumed to be robust enough to be switched under high pressure. Thus, there is no pressure relief using valves 110 and 124 as in the previous examples. In this example, the flow rate sensor 24' measures the amount of high pressure clear fluid that is communicated to the pipe 60A through the valve 120'. Valve 140' is closed. Clear fluid displaces slurry through the check valve 80A. When the amount of slurry through the check valve 80A has reached clear fluid as determined by the flow rate sensor 24' and thus the volume of fluid, the valve operation is reversed in that valve 120 is closed while valve 140 is open. This allows the tank 40A to be depressurized and low pressure slurry is then communicated to the tank to restart the process. When the amount of clear fluid that leaves the tank corresponds to a desired amount of slurry being input to check valve 80A, the valves 120' and 140' are reversed in operation.

Figure 2A:
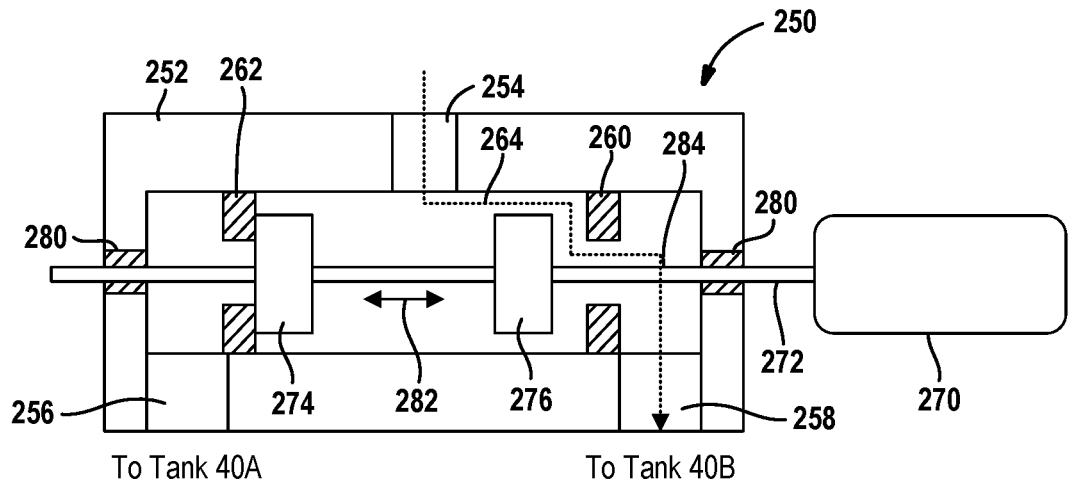
FIG. 2A is a cross-section of an exemplary three-way valve in a first position.
Figure 2B:
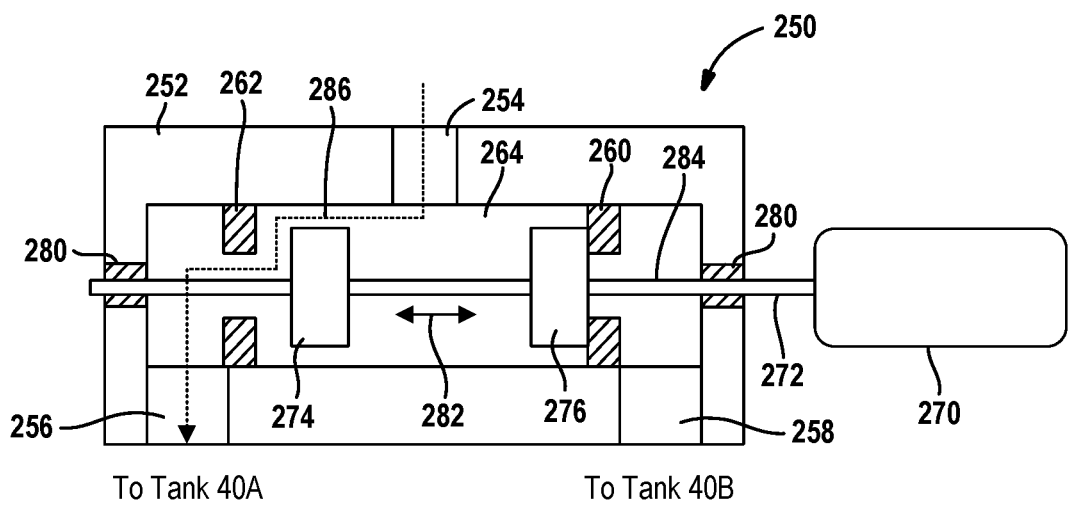
FIG. 2B is a cross-section of the exemplary three-way valve in a second position.

Referring now to FIGS. 2A and 2B, a valve 250 suitable for use as valve 110 or 120 in FIGS. 1A-1C is set forth. The valve 250 has a housing 252 which may be cylindrical in shape. The housing 252 includes an inlet or central port 254, a first outlet port 256 and a second outlet port 258. A pair of valve seats 260, 262 extends from the interior cavity 264 of the housing 252. The valve seat 260 is disposed between the inlet port 254 and the outlet port 258. The valve seat 262 is disposed between the inlet port 254 and the outlet port 256.

An actuator 270 has a spindle 272 which has a first valve disk 274 and a second valve disk 276 fixable coupled thereto. The valve disk 274 is disposed between the inlet port 254 and the valve seat 262. The valve disk 276 is disposed between the inlet port 254 and the valve seat 260. Packing 280 may be disposed between the spindle 272 and the housing 252 to facilitate longitudinal movement of the spindle 272 and the valve disks 274 and 276 as in the direction illustrated by the arrows 282 and to prevent leakage of fluid from cavity 264. In FIG. 2A, the valve disks 274, 276 and spindle 272 are moved in a longitudinally outward direction away from the actuator 270 so that the fluid flows between the inlet port 254 and the outlet port 258 as illustrated by the path 284. In FIG. 2B, the spindle is moved in the rightmost position toward the actuator 270 so that fluid travels from the inlet port 254 to the outlet port 256.

The actuator 270 may be various types of actuators such as an electrical actuator or a hydraulic actuator. In this example, an electric actuator has been used. The actuator 270 is sized to move the disks 274, 276 so that high pressure flow between the inlet port and one of the outlet ports is provided (once resumed during the state switching process). Further, the path corresponding to FIG. 1A is a high pressure clear fluid path of clear fluid. The other port which is closed is at a low pressure. The low pressure port corresponds to tank 40A or 40B depending on the state of operation. The high pressure input to the housing "pushes" the closed valve disk against the corresponding valve seat to ensure a very high closing force to prevent leakage. Because the high pressures are relieved during the switching process, the actuator is sized to overcome very little force (a little more than the packing places on the spindle 272).

Figure 3A:
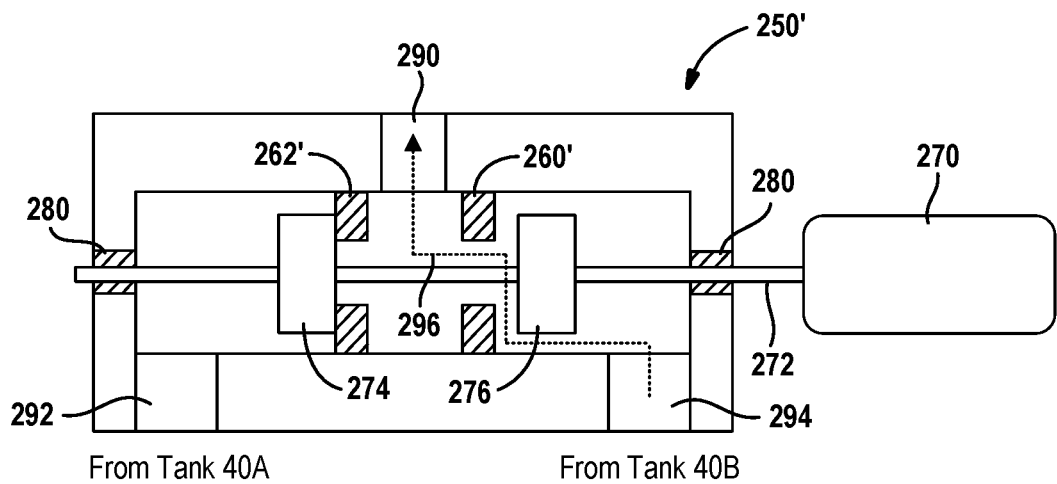
FIG. 3A is a second example of an exemplary three-way valve in a first position.
Figure 3B:
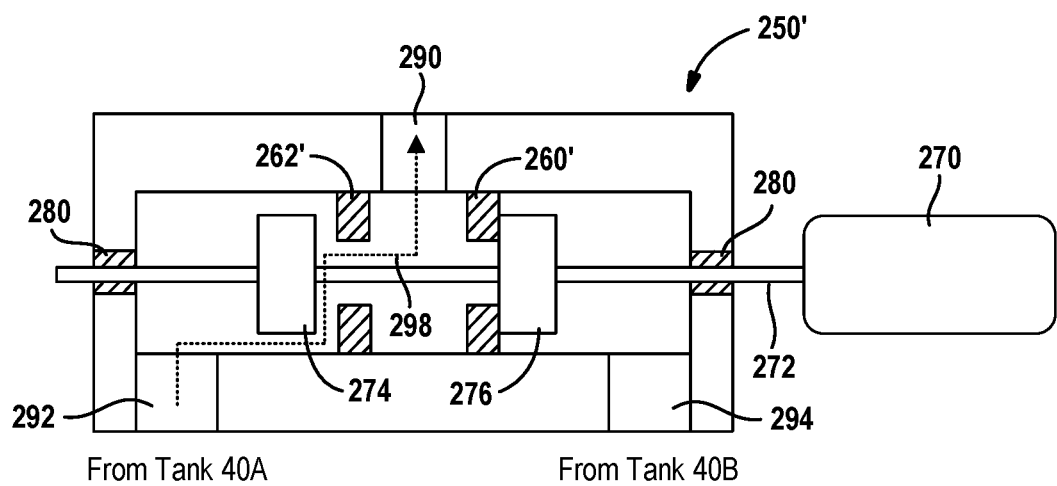
FIG. 3B is a second example of the exemplary three-way valve in a second position.

Referring now to FIGS. 3A and 3B, a valve 250' is illustrated having the same reference numerals as FIGS. 2A and 2B except for the changed components. The valve 250' illustrated in FIGS. 3A and 3B is suitable for use as valve 140 illustrated in FIGS. 1A-1C. In this example, the valve seats 260 and 262 have been changed to valve seats 260' and 262'. In this example, the valve seats 260', 262' are moved closer to the central port 290, which is an outlet port. The valve disks 274 and 276 are moved outboard of the valve seats 260' and 262'. In this example, the valve 250' has one outlet port 290 and two inlet ports 292, 294. One of the inlet ports is at low pressure and one is at high pressure during operation. The open port is at low pressure. The high pressure on the valve disk at high pressure forces it in communication with the associated valve seat. For example, in FIG. 3A, valve disk 274 is forced against valve seat 262'. In FIG. 3B, valve disk 276 is forced against valve seat 260'. In FIG. 3A, fluid path 296 communicates fluid from the second tank 40B to the outlet port 290 through fluid path 296. In FIG. 3B, fluid is communicated from tank 40A to outlet port 290 through fluid path 298. In each of the cases of FIGS. 2A-3B, a gap between the valve disks and the valve seats allows fluid to pass therethrough.

Figure 3C:
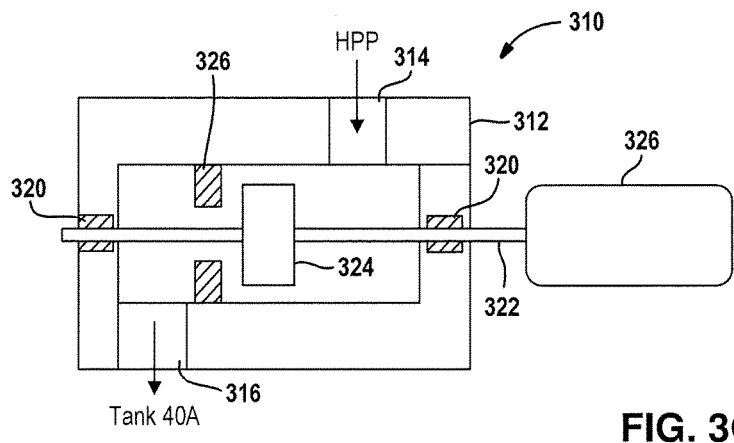
FIG. 3C is a cross-section of a first example of a two-way switch.

Referring now to FIG. 3C, a two-way valve 310 may be used to replace the three-way valves illustrated in FIGS. 1A-1F. That is, more than one two-way valve may be used to replace the three-way valves illustrated in the example set forth above. For a two-tank operation, two two-way valves may be used to replace a three-way valve. The valve 310 may also be used in a one tank solution as valves 120' or 140'. The valve 310 includes a housing 312 that has an inlet port 314 and an outlet port 316. The housing 312 includes packing 320 through which an actuator rod 322 extends therethrough. The actuator rod 322 includes a valve disk 324 which is moved by an actuator 326 coupled to the rod 322. The valve disk 324 may be displaced against the valve seats 326. When the valve disk 324 contacts the valve seat 326, the valve 310 is sealed and thus no flow from the inlet port 314 to the outlet port 316 takes place. In this example, when each of the three-way valves are replaced with two-way valves, each valve may have an independent actuator 326 to allow independent control. Thus, each two-way valve may have greater freedom in valve timing.

Figure 3D:
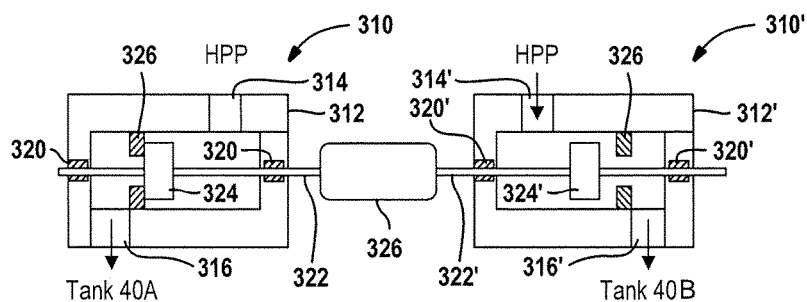
FIG. 3D is a cross-section of a second example of two two-way switches having two housings and a common actuator in a first position.
Figure 3E:
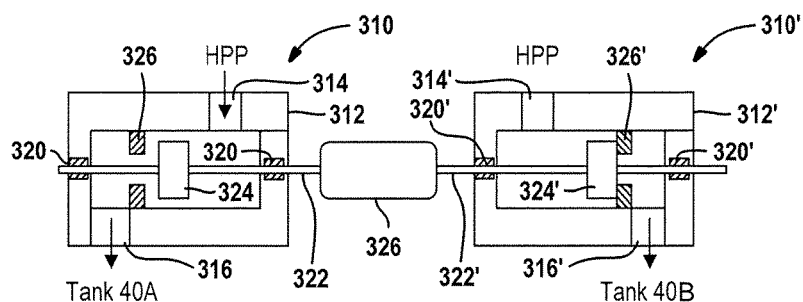
FIG. 3E is a cross-section of the second example of the two two-way switches of FIG. 3D in a second position.

Referring now to FIGS. 3D and 3E, a pair of two-way valves 310 are illustrated coupled to a common actuator 326. The common components of each valve are primed. In FIG. 3D, the right valve 310' is open while the left valve 310 is closed. In FIG. 3E, the left valve 310 is open and the right valve 310' is closed. By providing the exact same functionality as a three-way valve, the examples illustrated in FIGS. 3D and 3E may have some manufacturing advantages in resisting very high pressure operations due to the small size of each valve component.

Figure 3F:
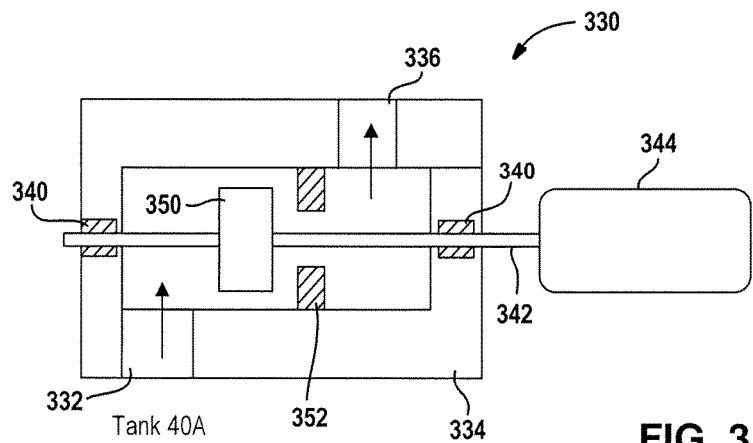
FIG. 3F is a cross-section of a third example of a two-way switch.

Referring now to FIG. 3F, a two-way valve 330 suitable for draining low pressure fluid from a tank is set forth. In this example, a port 332 is an inlet port within the housing 334. The inlet port 332 communicates fluid to a drain port 336. The housing 334 has packing 340 that receives the actuator rod 342 coupled to the actuator 344. The rod 342 moves the valve disk 350 toward or away from the valve seat 352. In FIG. 3F, the valve seat 352 is spaced apart from the valve disk 350 and thus fluid flows between the inlet port 332 and the outlet port 336. As mentioned above relative to FIG. 3C, the actuator 344 may be provided for each valve so that when two two-way valves replace a three-way valve, independent timing and control may be performed by the actuators for each valve.

Figure 3G:
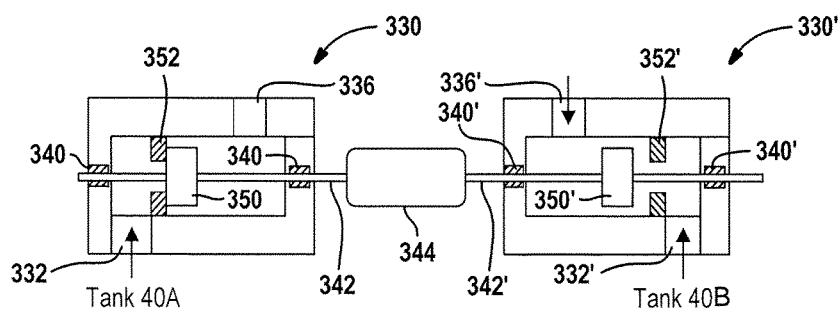
FIG. 3G is a cross-section of a fourth example of two two-way switches having two housings with a common actuator in a first position.
Figure 3H:
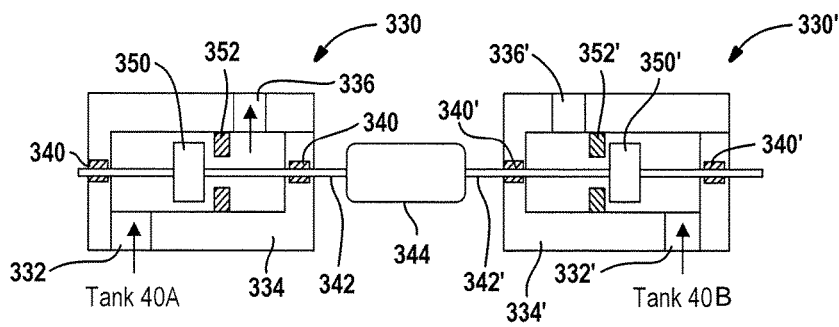
FIG. 3H is a cross-section of a fifth example of the two-way switches of FIG. 3G in a second position.

Referring now to FIGS. 3G and 3H, two valves 330, 330' may be in communication with a common actuator 344. In FIG. 3G, the left valve 330 is closed and the right valve 330' is open. The common components of valve 330 are primed in valve 330'. In FIG. 3H, the left valve is open and the right valve is closed. It should be noted that the valve disk 350 is located between the valve port 332 and the valve seat 352. When closed, the high pressure forces the valve disk 350 against the valve seat 352.

Referring now to FIG. 4A, a state table illustrating a transition of the valves from a first state to a second state is set forth. The first state "A" corresponds to the tank 40A injecting high pressure slurry into the injection site 12 while high pressure clear fluid is an input to the first tank 40A. At the same time, tank 40B is receiving low pressure slurry from the slurry tank 30 and expelling clear fluid to the fluid tank 92. During the first state illustrated as "A" in FIG. 4A, valve 80A is open, valve 82A is closed, valve 82B is open and valve 80B is closed. Three-way valve 140 is communicating fluid from port 140B to port 140C to the clear fluid tank 92. Valve 120 is communicating clear fluid from port 120A to 120B. Valve 110 is communicating clear fluid from port 110A to port 110B which ultimately communicates fluid through valve 120 and into tank 40A. Valve 124 is closed and valve 146 is partially open.

In the table set forth in FIGS. 4A (and 4B), the bolded cells indicate a change in the valve state. Thus, only the bolded cells will be described in the various states A1-A5. To begin the transition to state A', multiple valve states are changed in sequence. State A1 is achieved by changing the state of the three-way valve 110 to communicate fluid from inlet port 110A to outlet port 110C. The high pressure clear fluid from the pump 90 is diverted to the injection manifold 94. The high pressure clear fluid is no longer directed through the valve 120.

In state A2, the valve 150 is switched from communicating clear fluid from between port 150B and port 150C to communicating clear fluid from between port 150A and port 150C. The switching pressure differential of the valve 150 is reduced since the high pressure fluid is no longer being communicated to tank 40A through valve 120 due to the relief of high pressure clear fluid flowing to the injection manifold 94 through valve 110.

In state A3, the depressurization of the tank 40A results in the check valves 80A, 82A and 82B switching states. That is, valve 80A is closed, valve 82A is open, and valve 82B is closed. Check valve 80B remains closed for this portion of the state change. The three-way valves 140 and 120 are also changed in state. That is, valve 140 switches to communicate clear fluid from port 140A to port 140C. Three-way valve 120 communicates fluid from port 120A to port 120C. Notice, the switching of valves 120 and 140 are performed when low pressures are at all the ports.

In state A4, valve 124 is open which results in the check valve 80B being open. By opening the valve 124, pipe 114 and thus the flow through valve 120 is increased. Port 110B also sees an increased pressure.

In state A5, valve 124 is closed and valve 110 is switched in state to terminate the diversion of high pressure clear fluid from the pump 90 to the injection manifold 94. That is, valve 110 switches states so that clear fluid is communicated between inlet port 110A and outlet port 110B. The switching is performed while both ports 110A and 110B are under a high pressure due to the diversion of high pressure clear fluid through valve 124.

In this example, states A1-A5 are switched 0.20, 0.3, 0.2, 0.25 and 0.20 seconds respectively for a total switching state time of 1.15 seconds. Of course, the timing may be adjusted based on various conditions.

In state A', a steady state of operation is achieved with check valve 80A closed, check valve 82A open, check valve 82B closed, check valve 80B open, and three-way valve 140 communicating low pressure fluid to the tank 40A. Valve 120 is communicating high pressure clear fluid to the tank 40B which results in high pressure slurry being injected into the injection site 12 through the injection manifold 94. The valve 150 is communicating fluid from tank 40A while valve 124 is closed. Valve 146 is partially open. As will be described in more detail below, the switching of the valves takes place based upon comparison from the signals from the flow rate sensors 22 and 24. A comparison of the flow signals from flow rate sensors 22 and 24 are compared. The flow rate sensor signals correspond to the volume of clear fluid entering one tank and leaving the other tank.

Referring now to FIG. 4B, operation of the injection system 10' is illustrated. All of the states are the same except for the valve 150 has been replaced by the valves 210A and 210B. In steady state A, valve 210A is closed and valve 210B is open while the remaining valves are the same as in FIG. 4A. In state A1, valves 210A and 210B remain closed and open, respectively. In step A2, valve 210A is open while valve 201B is closed. This allows the pressure in the first tank 40A to be depressurized or relieved of pressure. In the remaining states A3-A5, valve 210A remains open while valve 210B is closed. Likewise, in steady state A', valves 210A and 210B are open and closed, respectively.

Referring now to FIG. 4C, a state diagram illustrating the operation or position of the valves of FIG. 1I is set forth. In the slurry discharge state, valve 80A is open, valve 82A is closed, valve 120' is open, valve 140' is closed, valve110 is open, valve 124 is closed and valve 210A is closed. Valve 146 is partially closed so that the flow to the low pressure clear fluid source is regulated. The state A illustrated a slurry discharge state in steady state operation. To transition through the process after slurry has been fully discharged as indicated by the output of the flow rate sensors, state A1 operates in the same manner except for valve 110 has diverted flow to the manifold 94. The remaining states are the same. In state A2, valve 80A is closed and valve 210A is open. This allows the tank 40A to be depressurized.

In state A3, valves 82A, 120' and 140' are switched states so that valve 82A is open, valve 120' is closed and valve 140' is open. In state A', slurry begins to fill the tank. Slurry fills the tank until a predetermined amount of clear fluid is discharged as determined by the flow rate sensor 22. In state A'-1, the slurry discharge cycle is started by changing the states of valves 120' to open and 140' to closed. This stops the slurry fill. In state A'-2, the valve 110 is open. The system then continues in this state which corresponds to state A where slurry is discharged. The process then starts over again.

Figure 5:
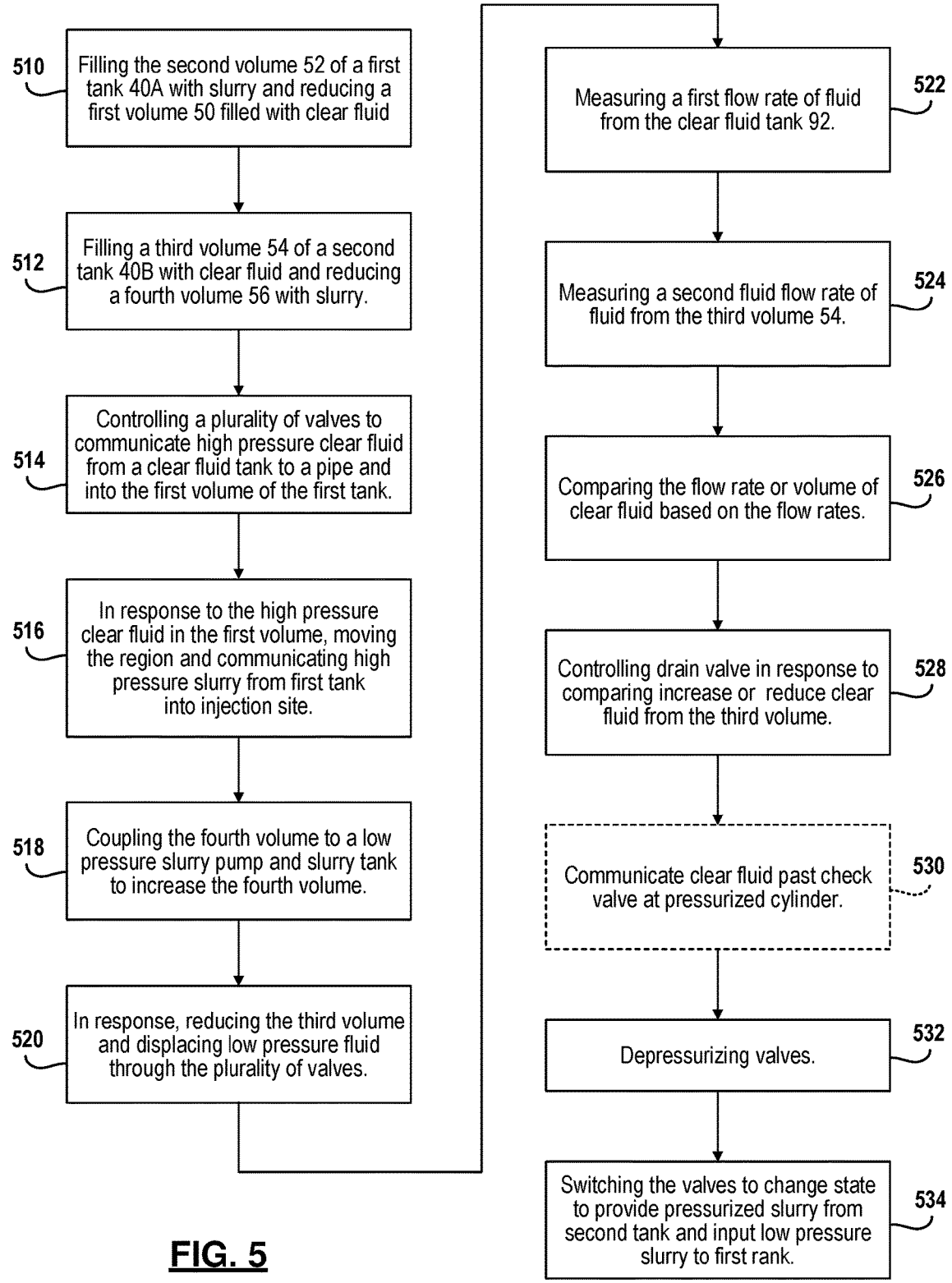
FIG. 5 is a flowchart for a first example of a method for operating the system.

Referring now to FIG. 5, a method of operating the system set forth in FIGS. 1A-1H is set forth. In step 510, the second volume 52 is filled with slurry in tank 40A and a first volume 50 is filled with clear fluid. In step 512, a third volume 54 of the second tank is filled with clear fluid which is reduced by filling the fourth volume 56 with slurry from the low pressure slurry tank 30.

In step 514, the plurality of high pressure valves 110 and 120, in particular, communicate high pressure clear fluid from the pump 90 and into the pipe 60A. In response to communicating the high pressure clear fluid, step 516 moves the region 68A toward the end cap (downward in FIG. 1A) and high pressure slurry is communicated through the check valve 80A into the injection manifold 94 and injection.

In step 518, a fourth volume 56 is fluidically coupled to allow the slurry from the slurry pump 32 and slurry tank 30 to increase the fourth volume. In response to increasing the fourth volume, clear fluid is reduced within the third volume which is displaced through the pipe 60B and is fluidically communicated through the valves 140 and 146 into the clear fluid tank 92. In step 522, the fluid flow rate of fluid from the tank 92 is measured by flow rate sensor 24. In step 524, a second fluid flow rate is determined from fluid flowing from the third volume 54 into the tank 92. That is, the amount of clear fluid from the tank 40B communicated to the clear fluid tank 92 is measured. In step 526, the controller 20 compares the first fluid flow rate and the second fluid flow rate. The flow rates correspond to the volumes entering and leaving tank 92. In step 528, the drain valve 146 is controlled in response to comparing so that the flow through the valve 146 is increased or decreased based upon the comparison. Ultimately, the amount of fluid flowing from the second tank may be controlled so that the amount of slurry ready to be injected from the second tank 40B is available when the tank 40A is depleted of slurry. Preferably, while draining the tank 40A of slurry, the amount of clear fluid may extend through the end cap and just past the check valve 80A so that the check valve 80A closes in a clean fluid environment rather than in a slurry environment in step 530. It is desirable to have the tank 40B and thus volume 56 at a process maximum before states A1-A5 of FIGS. 4A and 4B are performed.

In step 532, the plurality of clear fluid valves are controlled to cause tank 40A to depressurize. This takes place in states A1 and A2 of FIGS. 4A and 4B.

In step 534, the valves are changed in state in steps A3-A5 so that the second tank 40B is pressurized while tank 40A is depressurized and fills with slurry. The switching process is described below.

Figure 6:
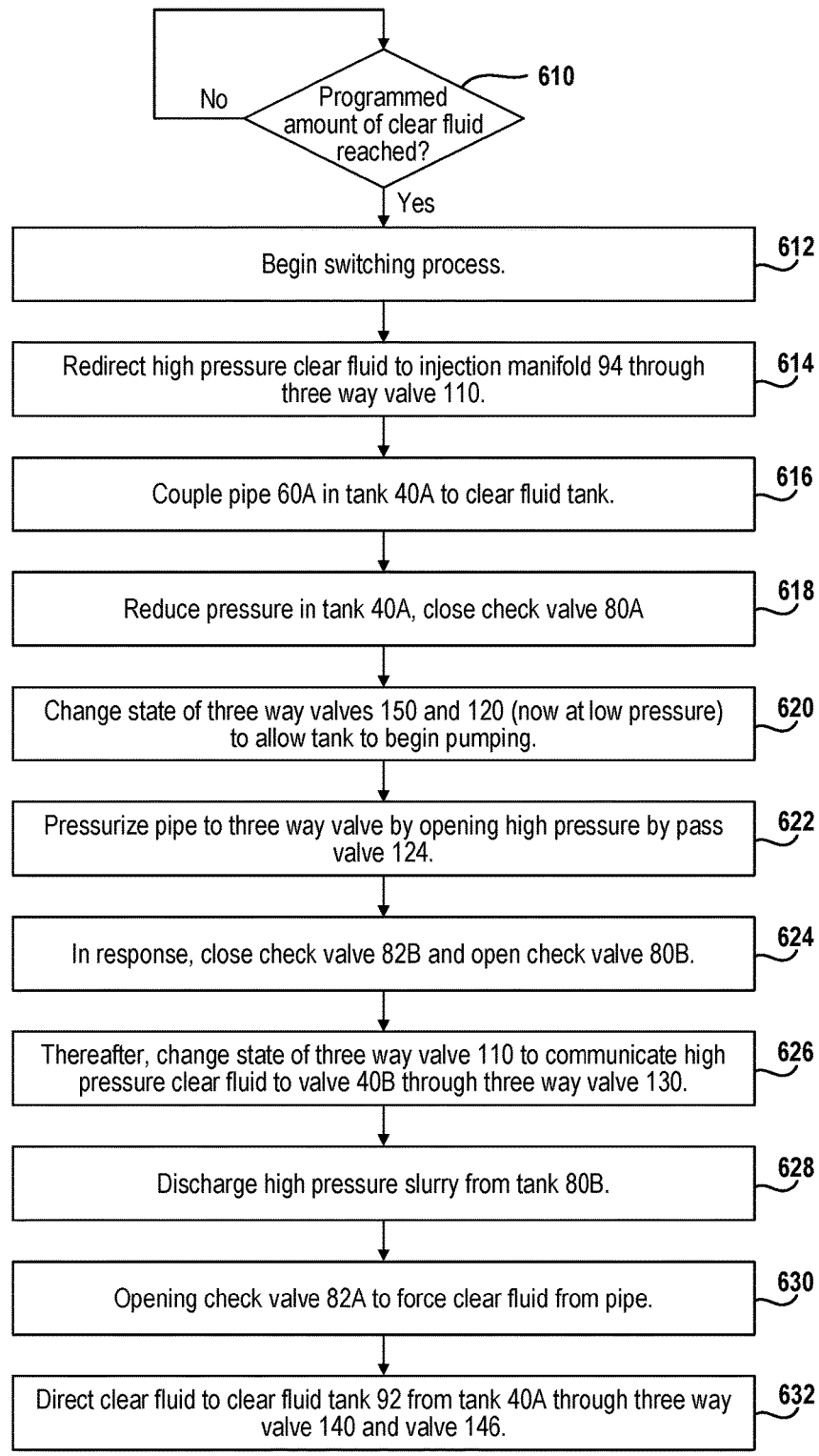
FIG. 6 is a flowchart of a method for switching states between a first tank and a second tank injection slurry.

Referring now to FIG. 6, the switching of the valves in the states between state A and state A' is illustrated in flowchart form. In step 610, if the desired amount of clear fluid being removed from the second tank 40B has been reached, the switching process begins. As mentioned above, this corresponds to the flow rate or volume determined by the flow rate. Step 610 uses the comparison of step 526 to make this determination. In step 612, the process of switching from state A to A' of FIGS. 4A and 4B is set forth. In step 614, high pressure clear fluid is redirected to the injection manifold through the three-way valve 110. In step 616, the first tank 40A is coupled to the clear fluid tank through valve 150. Check valve 80A closes in step 618 when the pressure in the tank 40A is reduced. The pressure reduction may be to or nearing to ambient pressure. In step 620, the state of the three-way valves 150 and 120 are also changed as the valves are changed toward state A'.

In step 622, the pipe to the three-way valve 120 is pressurized by opening the valve 124. In step 624, and in response to the bypass valve 124 being closed, valve 82B is closed and check valve 80B is open. Thereafter, in step 626 the state of the three-way valve 110 is changed to communicate high pressure clear fluid to tank 40B through the three-way valve 120. In step 628, high pressure slurry is discharged from tank 40B. In step 630, the check valve 82A is open to force clear fluid from the tank by displacing the clear fluid with low pressure slurry from the tank 15 and the slurry circulation pump 32. In step 632, clear fluid is communicated to the tank 92 through the valve 140 and valve 146.

Figure 7A:
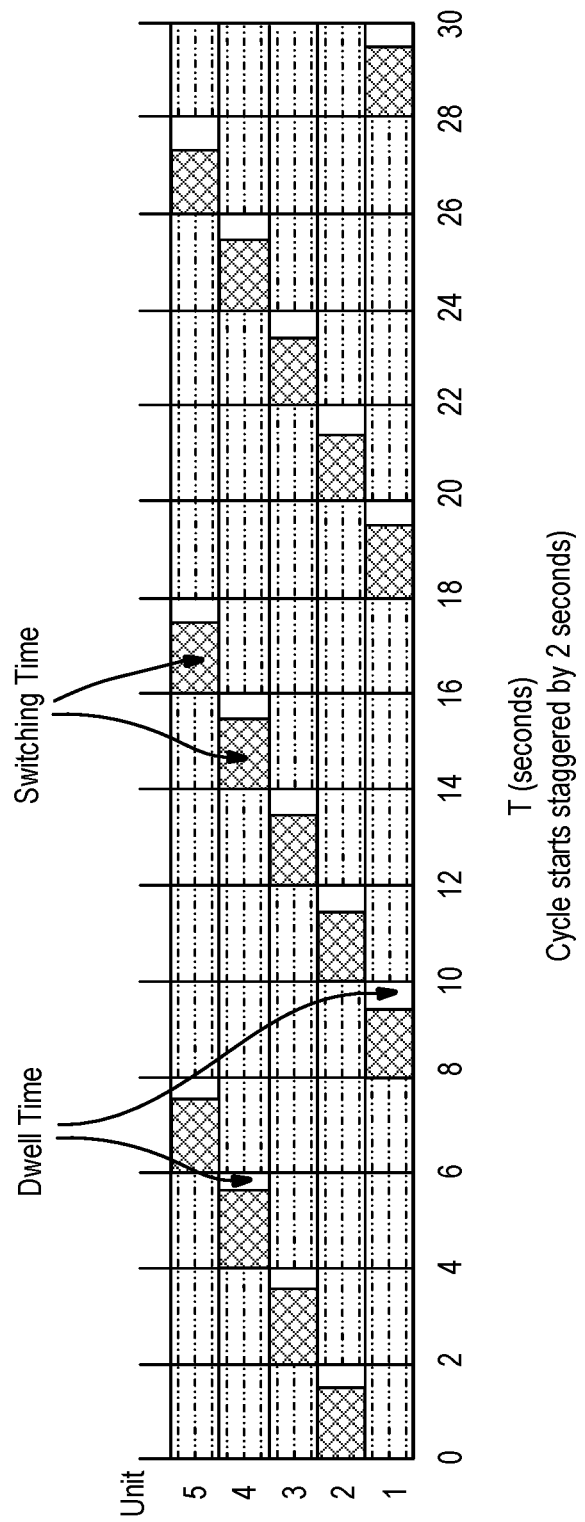
FIG. 7A is a timing chart of an injection system for a multiple unit slurry injection system with a dwell time.

Referring now to FIG. 7A, a timing diagram for a multiple unit system is set forth. Each unit referred to in FIG. 7A comprises a pair of tanks. In FIG. 1, only two units are illustrated. However, as mentioned above, a plurality of units are set forth. In this example, five units, unit 1-unit 5, are controlled having staggered starts of two seconds. That is, unit 1 starts at time 0 while unit 2 starts at 2 seconds, unit 3 at 4 seconds, unit 4 at 6 seconds, and unit 5 at 8 seconds. A small dwell time such as one-half second may be used in between each cycle for each unit to accommodate slightly slower cycle rates or other variations. That is, the nominal cycle illustrated in FIG. 7A is 9.5 seconds with a one-half second dwell time therebetween. Unit 1 restarts after the dwell time at 10 seconds, unit 2 at 12 seconds, unit 3 at 14 seconds, unit 4 at 16 seconds and unit 5 at 18 seconds.

By staggering the start times, the amount of slurry injected during the process may be maintained and gradually increased and decreased compared to a condition when the units would be in sync in terms of start times. Synchronized units may cause stress in the piping, valves and other components. The number of units may equal the cycle time divided by the switching time plus the dwell time which is multiplied by an integer. In this case, the cycle time is 10 seconds divided by the 2 second. The results are 5 units to obtain minimal flow variation. However integer multiples 10, 15 or 20 units (or more) may also be used to minimize flow variation.

Figure 7B:
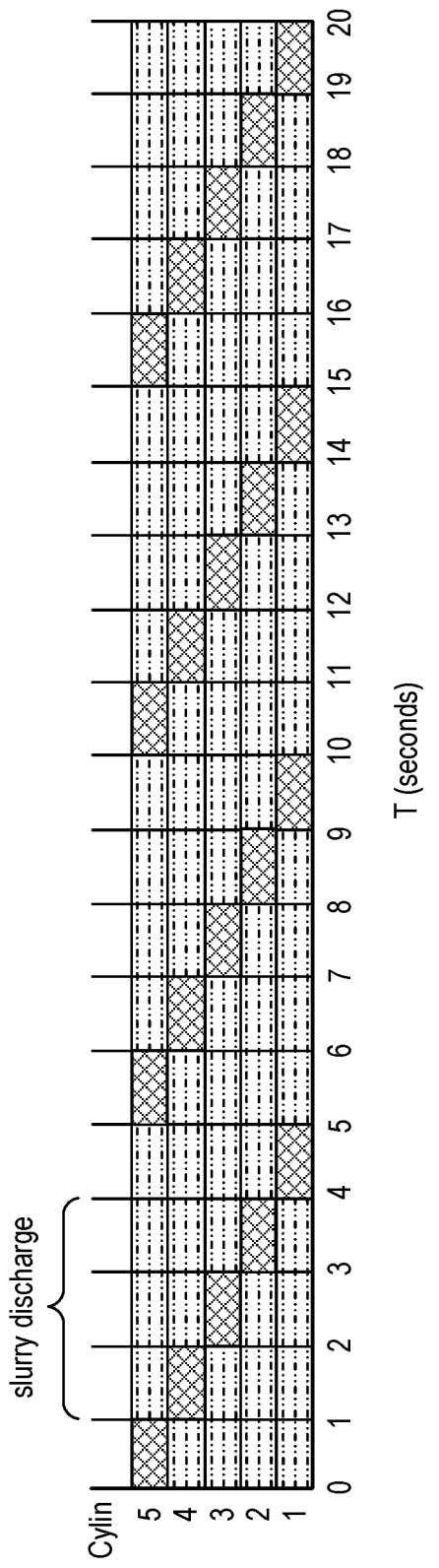
FIG. 7B is a timing chart of the injection system for a multiple unit slurry injection system with no dwell time.

Referring now to FIG. 7B, a timing chart of a system is set forth using single tank control such as the single tank of FIGS. 1I and 1J above. Single tank control with rapid slurry charging is set forth in FIG. 7B. In this example, each unit has a nominal five-second cycle time with four-second slurry discharge and a one-second slurry fill. In this example, no dwell time is assumed. However, a dwell time may be used in operation. The ratio of the slurry fill time to the slurry discharge time is 1:5. That is, the discharging of slurry takes place 80% of the time and slurry filling takes place 20% of the time. This is increased over the embodiments including two tanks in which half the time the tank is charging while the other half of the time the tank is discharging.

Referring now to FIG. 8A, a slurry concentrate pressurizer configuration 810 is illustrated. In this example, clear fluid is provided from a clear fluid source such as a reservoir 812 or tank. The reservoir 812 is in fluid communication with a low pressure pump 814. Clear fluid from the reservoir 812 enters a low pressure clear fluid manifold 816. The low pressure clear fluid manifold 816 is in communication with a trailer 818. Because the systems are moved from wellsite to wellsite, mounting the system components to a trailer is suitable. The trailer 818 may also be referred to as a "missile." The trailer 818 has a portion of the low pressure clear fluid manifold 820 and a portion of a high pressure clear fluid manifold 822 coupled thereto. The low pressure manifold 820 is in fluid communication with a plurality of high pressure clear fluid pumps 830. The pumps 830 may be referred to as fracking pumps. The plurality of pumps 830 may all be disposed on trailers 832 that may be hooked to a semi for easy transport from fracking site to fracking site. One or more pumps 830 may be disposed on each trailer 832. Each of the pumps 830 draws low pressure fluid from the low pressure manifold 820 through an inlet pipe 840 and discharges high pressure clear fluid through an outlet pipe 842. Only one each of pipes 840 and 842 are labeled. The high pressure manifold 822 is in fluid communication with a static mixer 852 though a two-way valve 850. The static mixer 852 is in communication with a well head 854. The high pressure clear fluid manifold 822 is in fluid communication with a slurry pressurizer 860 through a valve 862. A controller 864 is used to control the valves 850, 862 so that a portion of the high pressure clear fluid transmits through the valve 850 and a portion of the high pressure clear fluid is communicated to the slurry pressurizer 860. The controller 864 may be a programmable logic controller (PLC) that acts in response to one of more flow rate sensors 866A, 866B or 866C. Of course, flow rate sensors 866A, 866B, 866C may be disposed at various locations throughout the system 810 and generate flow signals that the controller 864 uses to control the system.

The slurry pressurizer 860 receives high pressure clear fluid and generates high pressure slurry through an output pipe 870 which is in fluid communication with the mixer 852. That is, the pipe 870 is in fluid communication with a point between the valve 850 and the mixer 852. The mixer 852 forms a mixture of concentrated high pressure slurry from slurry pressurizer 860 and water from the valve 850.

The slurry pressurizer 860 also receives low pressure slurry from a blender unit 872 through a pipe 874. The blender unit 872 may also receive additive from an additive tank 876 which is in fluid communication with a dosing pump 878. The dosing pump 878 communicates the fluid from the additive tank 876 into the blender unit 872. The additive within the additive tank 876 may comprise a gel or other types of additive using in the fracking process. The slurry unit 872 may blend slurry, fluid and additives to form the low pressure slurry.

A centrifugal separator 880 receives low pressure fluid from the slurry pressurizer 860. The centrifugal separator 880 may separate any residual slurry from within the low pressure discharge and communicate the slurry matter to the blender unit 872 through the pipe 882 for re-use. The separator 880 may also communicate clear fluid to the low pressure manifold through pipe 884.

The blender unit 872 may also receive low pressure clear fluid from the low pressure manifold 816 through a pipe 886. The low pressure clear fluid may be used to form the slurry.

In operation, the slurry pressurizer 860 may be disposed on a trailer 890. The slurry pressurizer unit 860 may be one or more of the examples set forth in FIG. 1A-1F. Both single or double tank slurry injection units may be used for the slurry pressurizer 860. In operation, the controller 864 controls the valve 850. The valve 850 may be used to create a differential pressure between a pipe 892 and pipe 870. The differential pressure may be 75 psi or less. The valve 862 may be precisely controlled so that the pressure thereacross is between 1 and 20 psi. Valve 850 may be designed to not fully close. That is, a predetermined amount of flow through the valve 850 so that a predetermined amount of pressure differential is present across the valve 850. For example, a 100 psi pressure differential may be used. The valve cannot fully close preventing accidental overpressurizing of the pumps and the piping. A suitable valve may be a leaky butterfly valve or a ball valve that is not allowed to physically close due to the geometry therein.

Referring now to FIG. 8B, the static mixer 852 is illustrated in further detail. The static mixer 852 has mixing elements 910 set forth therein for mixing the slurry and clear fluid communicated through the valve 850. The mixer 852 blends the clear fluid and the concentrated slurry from the slurry pressurizer 860 that is received through the pipe 870.

In the example set forth in FIGS. 8A and 8B, the fracking pumps are supplied by a single low pressure clear fluid line. The slurry pressurizer 860 draws low pressure clear fluid and returns low pressure clear fluid back to the clear fluid manifold 816. These connections minimize the amount of piping in a system. The centrifugal separator 880 separates the slurry particulates from the low pressure clear fluid to negligible amounts so that a minimum amount of particulates are in the clear fluid when entering the high pressure pumps. If various ones of the pumps 830 fail, the system can continue to pressurize slurry with minimal effect on the operation. The trailers 832 containing the pumps 830 may easily be maneuvered to allow additional or replacement pumps to be quickly connected to the trailer 818.

Because of the configuration, all the high pressure slurry mass is provided by the trailer containing the slurry pressurizer 860. The slurry pressurizer 860 may use vertical cylinders which keep the slurry in drive fluid from excessive mixing. As mentioned above, pistons may also be used within the various tanks to prevent mixing of the fluids therein, particularly if the tanks are disposed at another angle other than vertical. The valves within the slurry pressurizer have a generally low cycle rate of once every five to ten seconds versus six times per second in a typical fracking pump. Valves designed for low velocities and materials that minimize erosion from concentrated slurry may be used.

Some slurry processes use 0.5 pounds of sand per gallon of high pressure clear fluid or about 0.75% concentration by weight. Highly dense slurry may contain five pounds of sand per gallon. Based on the ratio, the slurry pressurizer 860 may only need to handle a flow of approximately 10% of the total high pressure clear fluid flow to achieve a desired slurry concentration downstream of the mixer 852. The additive tank 876 may pass the additives through the slurry pressurizer 860 and the capacity of the slurry pressurizer may be reduced. Because the slurry pressurizer 860 may provide a highly concentrated slurry due to the later mixing within the mixer 852, the system may be referred to as a slurry concentrate pressurizer.

Figure 9:
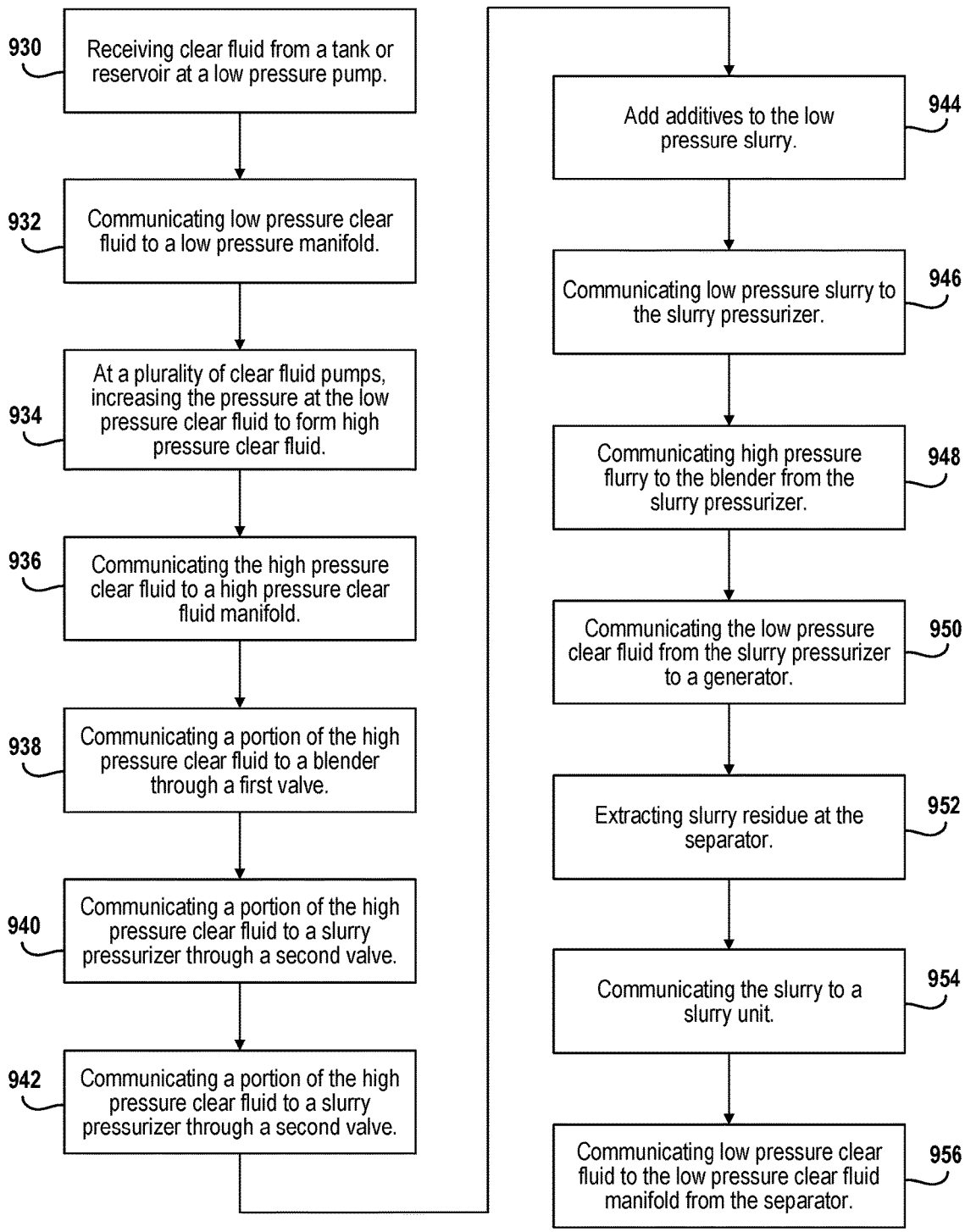
FIG. 9 is a flowchart of a method for operating the system of FIG. 8.

Referring now to FIG. 9, a method for operating the system of FIGS. 8A and 8B is set forth. In step 930, clear fluid is received from a tank or reservoir at a low pressure pump. In step 932, the low pressure clear fluid is communicated to a low pressure manifold. The low pressure is not high enough to operate the slurry pressurizer illustrated in FIG. 8. In step 934, a plurality of clear fluid pumps that are coupled to both a high pressure clear fluid manifold and a low pressure clear fluid manifold increase the pressure of the low pressure clear fluid. In step 936, the high pressure clear fluid generated at the plurality of clear fluid pumps is communicated to a high pressure clear fluid manifold.

In step 938, a portion of the high pressure clear fluid is communicated from the high pressure clear fluid manifold through a mixer through a first valve. In step 940, a portion of the high pressure clear fluid from the high pressure clear fluid manifold is communicated to a slurry pressurizer through a second valve. In step 942, the flow through the first valve and second valve is adjusted based on a flow rate or a pressure monitored within the system.

In step 944, additives may be added to the low pressure slurry. For example, the additives may be a gel or other types of additives suitable for improving the slurry fracking process. Step 944 is an optional step. Additives may be communicated to a slurry unit from a tank and a dosing pump.

In step 946, low pressure slurry is communicated to the slurry pressurizer. In step 948, high pressure slurry is communicated to the mixer from the slurry pressurizer. In step 950, the low pressure clear fluid from the slurry pressurizer is communicated to a separator. The low pressure clear fluid is the result of the pressure transfer at the slurry pressurizer of high pressure from the high pressure clear fluid to the increase in pressure of the low pressure slurry to high pressure slurry. In step 952, the slurry residue may be extracted at a separator. The clear fluid may have a small amount of slurry therein. In step 954, the separated slurry at the extractor is communicated to the slurry unit and is later used for reinjecting to the slurry pressurizer. In step 956, low pressure clear fluid is communicated to the low pressure clear fluid manifold from the separator. Should the clear fluid have an acceptably low amount of slurry particles therein, the separator may be eliminated from the system.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system for injecting slurry from a slurry source into a slurry injection site comprising:
    a first elongated tank comprising a first end having a first volume and a second end having a second volume, said first volume separated from the second volume;
    a first pipe having a first end external to the first elongated tank, said first pipe extending into the first elongated tank through the second volume so that a second end is disposed within the first elongated tank and ends within the first volume;
    a plurality of slurry valves fluidically coupled to the first elongated tank, said plurality of slurry valves having a first state communicating high pressure slurry from the second volume to the slurry injection site and a second state communicating low pressure slurry into the second volume; and
    a plurality of clear fluid valves fluidically coupled to the first elongated tank communicating high pressure clear fluid to the first volume in the first state and communicating low pressure clear fluid from the first volume in the second state.

2. The system of claim 1 further comprising a first flow rate sensor generating a first flow rate of low pressure clear fluid being communicated from the first elongated tank, a second flow rate sensor generating a second flow rate of high pressure clear fluid being communicated to the first elongated tank and a controller controlling the plurality of valves in response to the first flow rate and the second flow rate.

3. The system of claim 1 wherein the plurality of clear fluid valves comprises a first three-way valve diverting high pressure fluid to the injection site and a first two-way valve reducing pressure in the first elongated tank.

4. The system of claim 1 wherein the plurality of clear fluid valves comprises:
    a first valve selectively communicating high pressure clear fluid from a high-pressure injection manifold to a second valve;
    the second valve selectively communicating high pressure clear fluid from the first valve to the first pipe; and
    a third valve communicating low pressure clear fluid from the first pipe to a low pressure clear fluid manifold through a fourth valve.

5. The system of claim 4 further comprising:
    a bypass valve selectively coupling high pressure clear fluid to the second valve to the second valve.

6. The system of claim 4 wherein the first valve comprises a first three-way valve, the second valve comprises a first two-way valve, and the third valve comprises a second two-way valve.

7. The system of claim 4 further comprising a fifth valve selectively depressurizing the first tank.

8. The system of claim 1 wherein the first elongated tank comprises a first end cap at the second end of the first elongated tank, said first end cap comprising a first conical portion.

9. The system of claim 8 wherein the first pipe extends through the first end cap.

10. The system of claim 9 wherein the second end of the first pipe comprises a first flow distribution plate.

11. The system of claim 8 wherein the first end cap fluidically couples a first check valve and a second check valve of the plurality of slurry valves to the second volume.

12. The system of claim 1 wherein the plurality of clear fluid valves comprises a first valve having a housing with a central port disposed between a second port and a third port, said housing comprising a first valve seat spaced apart from a second valve seat, said first valve seat disposed between the central port and the second port and a second valve seat disposed between the central port and the third port, said housing coupled to an actuator comprising a first valve disk and a second valve disk.

13. The system of claim 12 wherein said first valve disk is disposed between the central port and the first valve seat and the second valve disk is disposed between the central port and the second valve seat.

14. The system of claim 12 wherein said second valve disk is disposed between the central port and the second valve seat and the second valve disk is disposed between the second port and the second valve seat.

15. The system of claim 1 wherein the plurality of clear fluid valves comprises a first valve having a first housing with a first inlet port and a first outlet port, said first housing comprising a first valve seat disposed between the first inlet port and the first outlet port, said first housing coupled to an actuator actuating a first valve disk.

16. The system of claim 15 wherein the first valve disk is disposed between the first inlet port and the first valve seat.

17. The system of claim 15 wherein the first valve disk is disposed between the first outlet port and the first valve seat.

18. The system of claim 15 wherein the actuator is coupled to a second valve having a second housing with a second inlet port and a second outlet port, said second valve comprising a second valve disk, said second housing comprising a second valve seat disposed between the second inlet port and the second outlet port, said actuator dependently controlling movement of the first valve disk and the second valve disk.

19. The system of claim 1 wherein the first elongated tank is disposed horizontally, said tank comprising a plurality of longitudinally extending partitions that define horizontally extending channels.

20. The system of claim 19 wherein the partitions are cylindrical.

21. The system of claim 19 wherein the partitions are radially extending walls.

22. A method of injecting slurry at a slurry injection site using a slurry injection system having a first elongated tank having a first volume and a second volume comprising:
using a plurality of slurry valves fluidically coupled to the first elongated tank,
in a first state, communicating high pressure slurry from the second volume to the slurry injection site;
in a second state, communicating low pressure slurry to the second volume;
using a plurality of clear fluid valves fluidically coupled to the first elongated tank through a clear fluid pipe having a first end external to the first elongated tank, said clear fluid pipe extending into the first elongated tank through the second volume so that a second end is disposed within the first elongated tank and ends within the first volume,
in a first state, communicating high pressure clear fluid to the first volume through the clear fluid pipe; and
in a second state, communicating low pressure clear fluid from the first volume through the clear fluid pipe.

23. The method as recited in claim 22 wherein the steps of communicating low pressure slurry comprise communicating low pressure fluid from a slurry tank using a slurry circulation pump.

24. The method as recited in claim 22 wherein the step of communicating low pressure slurry comprise communicating low pressure fluid from a low pressure slurry manifold.

25. The method as recited in claim 22 wherein the steps of communicating high pressure clear fluid comprises forming high pressure clear fluid from a clear fluid tank using a high pressure pump.

26. The method as recited in claim 22 further comprising switching between the first state and the second state in response to a first flow rate signal and a second flow rate signal.

27. The method as recited in claim 26 further comprising generating the first flow rate signal corresponding to low pressure clear fluid leaving the first elongated tank in the second state, generating a second flow rate signal corresponding to high pressure clear fluid communicated to the first elongated tank switching in the first state.

28. The method as recited in claim 26 wherein switching between the first state and the second state comprises reducing pressure in the first tank prior to switching the plurality of clear fluid valves.

29. The method of claim 26 wherein switching between the first state and the second state comprises depressurizing the first tank by redirecting high pressure clear fluid to an injection manifold and opening a first clear fluid valve to draining low pressure clear fluid from the first elongated tank.

30. The method of claim 26 wherein switching between the first state and the second state comprises communicating high pressure clear fluid from the first tank past a check valve before closing the check valve.

31. The method of claim 30 wherein communicating high pressure clear fluid past the check valve comprises communicating high pressure clear fluid past the check valve through an opening in a piston.

* * * * *